US012142139B2

(12) United States Patent
Fields et al.

(10) Patent No.: US 12,142,139 B2
(45) **Date of Patent: *Nov. 12, 2024**

(54) AUTONOMOUS VEHICLE MODE ALERT SYSTEM FOR BYSTANDERS

(71) Applicant: STATE FARM MUTUAL AUTOMOBILE INSURANCE COMPANY, Bloomington, IL (US)

(72) Inventors: Brian Mark Fields, Phoenix, AZ (US); Steve Roberson, Normal, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/227,247

(22) Filed: Jul. 27, 2023

(65) Prior Publication Data

US 2023/0368656 A1 Nov. 16, 2023

Related U.S. Application Data

(63) Continuation of application No. 17/946,839, filed on Sep. 16, 2022, now Pat. No. 11,756,415, which is a continuation of application No. 17/321,079, filed on May 14, 2021, now Pat. No. 11,482,097, which is a continuation of application No. 16/808,097, filed on (Continued)

(51) Int. Cl.
*G08G 1/005* (2006.01)
*G08G 1/017* (2006.01)

(52) U.S. Cl.
CPC ............ *G08G 1/005* (2013.01); *G08G 1/017* (2013.01)

(58) Field of Classification Search
CPC .............................. G08G 1/005; G08G 1/017
See application file for complete search history.

(56) References Cited

U.S. PATENT DOCUMENTS 9,227,567 B2 1/2016 Fujii
9,311,271 B2 4/2016 Wright (Continued)

FOREIGN PATENT DOCUMENTS

EP 3239686 A1 11/2017
EP 3578433 B1 8/2020

(Continued)

*Primary Examiner* — Chico A Foxx
(74) *Attorney, Agent, or Firm* — MARSHALL, GERSTEIN & BORUN LLP

(57) ABSTRACT

An alert may be triggered to notify a pedestrian of the current operational mode of a nearby vehicle. For instance, a vehicle may operate in an autonomous or manual mode, and may occasionally switch from one mode to the other. A pedestrian who may be unaware of the current operational mode of a nearby vehicle may notice the alert and proceed accordingly. In one embodiment, an indication of the current operational mode of the nearby vehicle may be transmitted to an electronic device associated with the pedestrian. The device may generate a notification to the pedestrian based on the current operational mode. In an additional or alternative embodiment, the alert may be transmitted by the vehicle externally to be visible or audible to the pedestrian. In some embodiments, the alert may be triggered only for particular operational modes (e.g., only for autonomous or only for manual).

20 Claims, 8 Drawing Sheets

Related U.S. Application Data

Mar. 3, 2020, now Pat. No. 11,037,439, which is a continuation of application No. 16/288,837, filed on Feb. 28, 2019, now Pat. No. 10,621,859, which is a continuation of application No. 15/656,092, filed on Jul. 21, 2017, now Pat. No. 10,262,528.

(56) References Cited

U.S. PATENT DOCUMENTS

| | | | |
|---|---|---|---|
| 9,513,632 | B1 | 12/2016 | Gordon et al. |
| 9,633,487 | B2 | 4/2017 | Wright |
| 9,688,288 | B1 | 6/2017 | Lathrop et al. |
| 9,830,748 | B2 | 11/2017 | Rosenbaum |
| 9,881,503 | B1 * | 1/2018 | Goldman-Shenhar ........................ B60Q 5/006 |
| 9,953,538 | B1 | 4/2018 | Matthiesen et al. |
| 9,990,782 | B2 | 6/2018 | Rosenbaum |
| 10,192,369 | B2 | 1/2019 | Wright |
| 10,198,879 | B2 | 2/2019 | Wright |
| 10,269,190 | B2 | 4/2019 | Rosenbaum |
| 10,467,824 | B2 | 11/2019 | Rosenbaum |
| 10,771,921 | B2 | 9/2020 | Ueno et al. |
| 11,080,993 | B1 | 8/2021 | Shuman et al. |
| 11,227,452 | B2 | 1/2022 | Rosenbaum |
| 11,407,410 | B2 | 8/2022 | Rosenbaum |
| 11,524,707 | B2 | 12/2022 | Rosenbaum |
| 11,594,083 | B1 | 2/2023 | Rosenbaum |
| 2005/0073438 | A1 | 4/2005 | Rodgers et al. |
| 2007/0171854 | A1 * | 7/2007 | Chen ...................... G08G 1/205 370/328 |
| 2010/0102991 | A1 * | 4/2010 | Hernandez ............. G08G 1/005 340/944 |
| 2011/0133915 | A1 | 6/2011 | Ito |
| 2012/0025964 | A1 | 2/2012 | Beggs et al. |
| 2012/0299713 | A1 | 11/2012 | Elia et al. |
| 2013/0127638 | A1 | 5/2013 | Harrison |
| 2013/0154815 | A1 | 6/2013 | Min et al. |
| 2014/0055259 | A1 | 2/2014 | Otani et al. |
| 2014/0132404 | A1 * | 5/2014 | Katoh ................... B60R 21/013 340/436 |
| 2015/0035685 | A1 | 2/2015 | Strickland et al. |
| 2015/0091740 | A1 | 4/2015 | Bai et al. |
| 2015/0228066 | A1 | 8/2015 | Farb |
| 2015/0346337 | A1 | 12/2015 | Jung |
| 2016/0179092 | A1 | 6/2016 | Park |
| 2016/0272172 | A1 | 9/2016 | Lee |
| 2017/0101054 | A1 * | 4/2017 | Dusane ............ G08G 1/096741 |
| 2017/0120803 | A1 | 5/2017 | Kentley et al. |
| 2017/0120804 | A1 | 5/2017 | Kentley et al. |
| 2017/0329337 | A1 | 11/2017 | Kusano et al. |
| 2017/0336795 | A1 | 11/2017 | Wei et al. |
| 2017/0345292 | A1 | 11/2017 | Haran |
| 2017/0356994 | A1 * | 12/2017 | Wodrich ................. G01S 13/87 |
| 2018/0072313 | A1 | 3/2018 | Stenneth |
| 2018/0114435 | A1 | 4/2018 | Singh et al. |
| 2018/0122240 | A1 | 5/2018 | Shirosaki et al. |
| 2018/0136654 | A1 | 5/2018 | Kentley-Klay et al. |
| 2018/0173237 | A1 | 6/2018 | Reiley et al. |
| 2018/0174460 | A1 | 6/2018 | Jung et al. |
| 2018/0276986 | A1 | 9/2018 | Delp |
| 2018/0302752 | A1 | 10/2018 | Ueno et al. |
| 2018/0308356 | A1 | 10/2018 | Voigt et al. |
| 2018/0342153 | A1 * | 11/2018 | Ellis ....................... G08G 1/012 |
| 2019/0043362 | A1 | 2/2019 | Morimura et al. |
| 2019/0049090 | A1 | 2/2019 | Krishnan et al. |
| 2019/0189008 | A1 | 6/2019 | Langona |
| 2019/0202347 | A1 | 7/2019 | Salter et al. |
| 2019/0210517 | A1 | 7/2019 | Baker et al. |
| 2019/0212731 | A1 | 7/2019 | Flynn et al. |
| 2019/0271458 | A1 | 9/2019 | Brown et al. |
| 2020/0114813 | A1 | 4/2020 | Lujan et al. |
| 2020/0152051 | A1 | 5/2020 | Morimura et al. |
| 2020/0184806 | A1 | 6/2020 | Yu et al. |
| 2021/0331690 | A1 | 10/2021 | Pierfelice et al. |
| 2021/0394793 | A1 * | 12/2021 | Austin ................. G08G 1/0112 |
| 2022/0092893 | A1 | 3/2022 | Rosenbaum |
| 2022/0340148 | A1 | 10/2022 | Rosenbaum |
| 2023/0060300 | A1 | 3/2023 | Rosenbaum |

FOREIGN PATENT DOCUMENTS

| | | | |
|---|---|---|---|
| EP | 3730375 | B1 | 10/2021 |
| EP | 3960576 | A1 | 3/2022 |
| EP | 4190659 | A1 | 6/2023 |
| EP | 4190660 | A1 | 6/2023 |

* cited by examiner

AUTONOMOUS VEHICLE MODE ALERT SYSTEM FOR BYSTANDERS

CROSS REFERENCE TO RELATED APPLICATIONS

This application is a continuation of U.S. patent application Ser. No. 17/946,839, entitled "Autonomous Vehicle Mode Alert System for Bystanders," and filed Sep. 16, 2022; which is a continuation of U.S. patent application Ser. No. 17/321,079, entitled "Autonomous Vehicle Mode Alert System for Bystanders," and filed May 14, 2021; which is a continuation of U.S. patent application Ser. No. 16/808,097, entitled "Autonomous Vehicle Mode Alert System for Bystanders," and filed Mar. 3, 2020; which is a continuation of U.S. patent application Ser. No. 16/288,873, entitled "Autonomous Vehicle Mode Alert System for Bystanders," and filed Feb. 28, 2019; which is a continuation of U.S. patent application Ser. No. 15/656,092, entitled "Autonomous Vehicle Mode Alert System for Bystanders," and filed Jul. 21, 2017; the disclosures of each of which are hereby expressly incorporated by reference herein in its entirety.

TECHNICAL FIELD

The present disclosure generally relates to technology for alerting a pedestrian of a current operational mode of a nearby vehicle.

BACKGROUND

Individuals have been operating vehicles as a means of transportation for decades. Recently, more and more vehicles have incorporated autonomous (or semi-autonomous) operational features or modes, in which an on-board computer or mobile device associated with a vehicle may operate the vehicle with little to no human input. However, vehicles having autonomous operational modes may also include manual features or modes, in which a human operator controls at least some aspects of the operation of the vehicle. Such vehicles may occasionally switch from operating autonomously to operating manually, or vice versa, for various reasons.

Autonomous vehicle operation may have some advantages over manual vehicle operation, but may also have some additional safety risks, for instance, in certain areas in which autonomous vehicle operation is less common, or in certain unpredictable conditions. Similarly, manual vehicle operation may have some advantages over autonomous vehicle operation, but may also have some additional safety risks, for instance, in certain areas in which manual vehicle operation is less common or in certain conditions in which human operators may be tired, distracted, or otherwise impaired. Accordingly, pedestrians or other bystanders who are aware of the operational mode of a nearby vehicle may proceed differently depending on whether the nearby vehicle is operating in an autonomous mode or a manual mode. However, pedestrians generally have no way of knowing the current operational mode of a nearby vehicle, let alone when the operational mode of a nearby vehicle has changed.

SUMMARY

In one aspect, a computer-implemented method for alerting pedestrians of operational modes of vehicles is provided. The method may include detecting, by an electronic device associated with a vehicle having one or more autonomous features. The current operational mode of the nearby vehicle may be one of an autonomous or manual operational mode. The method may further include determining, by the electronic device, a proximity of a nearby pedestrian to the vehicle, and triggering, by the electronic device, an alert based on the current operational mode when the proximity of the nearby pedestrian to the vehicle is equal to or less than a minimum pedestrian proximity. The alert may be configured to be audible or visible to the nearby pedestrian and configured to notify the nearby pedestrian of the current operational mode of the vehicle.

In another aspect, an electronic device configured to alert pedestrians of operational modes of nearby vehicles is provided. The electronic device may include a user interface, a transceiver configured to communicate data via at least one network connection, a memory configured to store non-transitory computer executable instructions, and a processor configured to interface with the user interface, the transceiver and the memory, and configured to execute the non-transitory computer executable instructions. The non-transitory computer executable instructions may cause the processor to: receive an indication of a current operational mode transmitted by a nearby vehicle having one or more autonomous features, wherein the current operational mode of the nearby vehicle is one of autonomous or manual, receive, via the user interface, a minimum vehicle proximity, determine a proximity of the nearby vehicle, and trigger an alert based on the current operational mode when the proximity of the nearby vehicle is equal to or less than the minimum vehicle proximity. The alert may be configured to notify a pedestrian of the current operational mode of the nearby vehicle.

In still another aspect, a computer-implemented method for alerting pedestrians of operational modes of nearby vehicles is provided. The method may include receiving, by an electronic device associated with a pedestrian, an indication of a current operational mode transmitted by a nearby vehicle having one or more autonomous features. The current operational mode of the nearby vehicle may be one of an autonomous or manual operational mode. The method may further include determining, by the electronic device associated with the pedestrian, the position of the electronic device, receiving, by the electronic device associated with the pedestrian, autonomous vehicle prevalence information from a database indicative of the prevalence of autonomous vehicles in an area surrounding the position of the electronic device, and triggering, by the electronic device associated with the pedestrian, an alert based, at least in part, on the current operational mode, and the autonomous vehicle prevalence information. The alert may be configured to notify the pedestrian of the current operational mode of the nearby vehicle.

DETAILED DESCRIPTION

Figure 1:
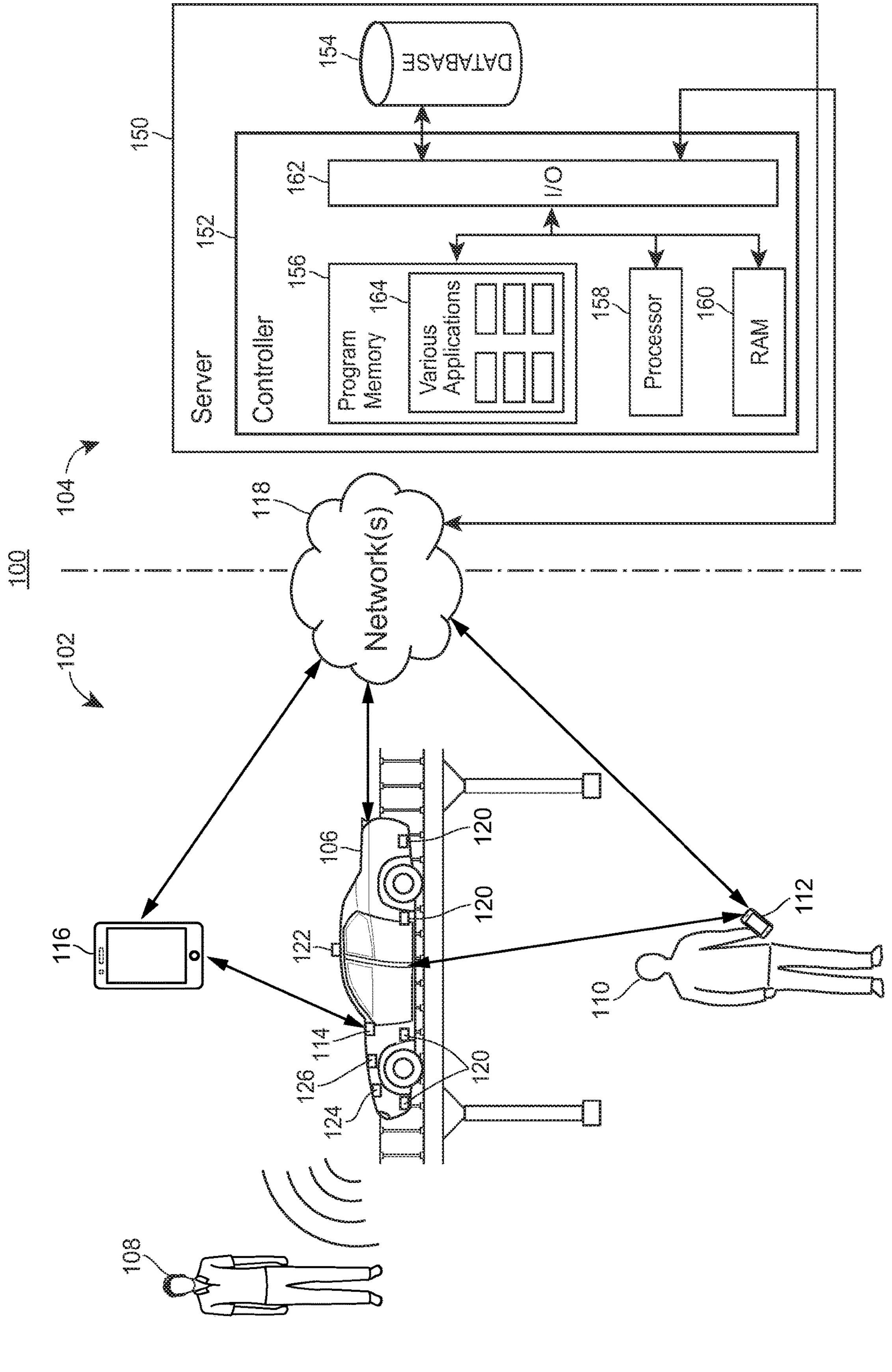
FIG. 1 depicts a block diagram of an exemplary system for alerting a pedestrian of the current operational mode of a nearby vehicle.

The present embodiments may relate to, inter alia, technology for alerting a pedestrian of the current operational mode (e.g., autonomous or manual) of a nearby vehicle. Pedestrians may sometimes be distracted and/or otherwise unaware of vehicles operating nearby. For instance, a pedestrian may be listening to music, looking at a mobile device, and/or talking with friends while walking on a sidewalk near a road, and may be unaware of oncoming traffic on the road. Any nearby vehicle may potentially be dangerous to a distracted pedestrian. But, in certain conditions or in certain locations, an autonomously operating vehicle may potentially be more dangerous to the pedestrian than a manually operating vehicle, or vice versa. For instance, a manually operating vehicle may potentially be more dangerous than an autonomously operating vehicle very late at night, because a manual operator of the vehicle may be tired, or may have difficulty seeing the road in dark conditions. As another example, an autonomously operating vehicle may potentially be more dangerous than a manually operating vehicle in certain weather conditions, because such conditions may create unpredictable traffic patterns, or may impair sensor functionality. Accordingly, it may be desirable to alert a pedestrian of the current operational mode of a nearby vehicle.

An electronic device associated with the pedestrian may receive an indication of the current operational mode of a vehicle and/or a current location of the vehicle. In response to the indication, the electronic device may trigger an alert notification configured to notify the pedestrian of the current operational mode of the vehicle. Additionally or alternatively, an on-board computer and/or mobile device associated with a vehicle may receive an indication of the current location of a nearby pedestrian who may not be equipped with an electronic device. Accordingly, the on-board computer and/or mobile device may trigger an audible or visible alert detectible by a pedestrian near the vehicle and configured to notify the pedestrian of the current operational mode of the vehicle. In some embodiments, an alert may be triggered only when the vehicle is currently in a particular operational mode (e.g., only when the vehicle is operating an autonomous mode or only when the vehicle is operating in a manual mode). Moreover, in some embodiments the alerts may be triggered only when the vehicle is within close proximity of the pedestrian and/or associated electronic device.

Upon noticing the alert, the pedestrian may become less distracted, and may in particular become aware of the nearby vehicle and its current operational mode. The pedestrian may then take steps to avoid the nearby vehicle, such as getting out of the road, moving further in on a sidewalk, or simply generally becoming more aware of his or her surroundings. For instance, if a vehicle is currently operating in an autonomous mode in an area where manual vehicle operation is much more prevalent, or vice versa, the likelihood of a vehicle accident may increase due to inconsistencies in the driving patterns of manually operating vehicles versus autonomously operating vehicles. Accordingly, a pedestrian may wish to proceed with caution when a vehicle in that particular, less common, mode is nearby. Moreover, the pedestrian may take particular steps appropriate to the particular current operational mode of the nearby vehicle. For instance, when a manually operating vehicle is nearby, it may be appropriate for a pedestrian to look to the face of a vehicle operator to make sure the vehicle operator is paying attention before crossing the street in front of the vehicle. As another example, when an autonomously operating vehicle is nearby, it may be appropriate for a pedestrian to consider whether sensor functionality may be impaired due to certain weather conditions (e.g., fog, storm, hail, etc.) before crossing the street in front of the vehicle.

The systems and methods therefore offer numerous benefits. In particular, the systems and methods effectively and efficiently trigger an alert to notify a pedestrian of the current operational mode (autonomous or manual) of a nearby vehicle. That is, a pedestrian may be distracted, unaware of his or her surroundings, or otherwise simply unaware of the current operational mode of a nearby vehicle. In particular, a pedestrian may be unaware of a switch in an operational mode of a nearby vehicle. After noticing the alert, the pedestrian may subsequently become aware and proceed accordingly. In this way, the safety of pedestrians near both autonomously and manually operating vehicles may be improved. Moreover, in embodiments, alerts may be triggered in real time, as soon as an indication of a nearby vehicle operating in a particular mode has been received by an electronic device associated with a pedestrian, or as soon as an indication of a nearby pedestrian has been detected by an on-board computer or mobile device associated with a vehicle. This real-time alert triggering may allow a pedestrian to become aware of the current operational mode of the nearby vehicle quickly, reducing the time in which the pedestrian may be too distracted, inattentive, or otherwise unaware to notice the operational mode of a nearby vehicle and safely proceed. It should be appreciated that other benefits are envisioned.

Moreover, the systems and methods discussed herein address a challenge that is particular to vehicle operation. In particular, the challenge relates to ensuring that pedestrians are aware of the current operational mode of nearby vehicles. That is, in some instances, the current operational mode of a vehicle is uncommon in the area or particularly risky due to external conditions. Pedestrians who are aware of an uncommon and/or risky operational mode of a nearby vehicle may therefore react appropriately to particular safety concerns associated with particular operational modes. For instance, a vehicle operating in an operational mode that is uncommon in a particular area (e.g., operating in an autonomous mode in an area where the majority of vehicles are operating in manual mode, or vice versa) may be more susceptible to vehicle-on-vehicle accidents. As another example, a vehicle operating in a manual mode late at night may be more likely to swerve out of its lane due to a human operator becoming tired or falling asleep at the wheel. As still another example, a vehicle operating in an autonomous mode in certain weather conditions may experience sensor impairment (e.g., if sensors become blocked by fog), and may be more likely to operate erratically and/or not detect obstacles. All of these possible safety issues (and of course others not listed) may in turn affect pedestrians standing, walking, running, or cycling on a road or close to it. However, when pedestrians are aware of the current operational mode of a nearby vehicle, pedestrians may take appropriate steps to proceed safely in light of particular risks and drawbacks of each operational mode.

Using conventional methods, the operational mode of a vehicle may go unnoticed by nearby pedestrians. While some vehicles having autonomous features may appear externally different from vehicles having manual features, others may look superficially identical, so a pedestrian may be unaware that an autonomously operating vehicle is approaching. Moreover, even where vehicles with autonomous features appear externally different from vehicles having manual features, such vehicles may be configured to switch to a manual operational mode in some conditions, which pedestrians may not realize at a glance. Additionally, a pedestrian may be distracted (e.g., talking to friends, looking at a mobile device, listening to music, etc.) and inattentive to approaching vehicles in general, let alone the operational modes of such vehicles, or whether such vehicles are currently operating in a particularly uncommon or risky operational mode. The systems and methods provided herein offer improved capabilities to solve these problems by dynamically triggering an alert to notify a pedestrian of the current operational mode of a nearby vehicle. Accordingly, a distracted or otherwise unaware pedestrian may notice the alert, which may persist until dismissal by the pedestrian or until the vehicle is no longer nearby or no longer operating in that particular operational mode. Because the systems and methods described herein employ the collection, analysis, and transmission of data associated with vehicles having autonomous features, the systems and methods are necessarily rooted in computer technology in order to overcome the noted shortcomings that specifically arise in the realm of vehicle operation.

Similarly, the systems and methods provide improvements in a technical field, namely, the safe operation of both manual and autonomous vehicles. Instead of the systems and methods merely being performed by hardware components using basic functions, the systems and methods employ complex steps that go beyond the mere concept of simply retrieving and combining data using a computer. In particular, the various hardware components described herein control the operation of the vehicle, and trigger alerts to notify a pedestrian of the operational mode of the vehicle, among other functionalities.

According to implementations, the systems and methods may support a dynamic, real-time or near-real-time analysis of any captured, received, and/or detected data. In particular, an electronic device associated with a pedestrian may receive an indication that a nearby vehicle is currently operating in a particular operational mode in real-time or near real-time, and may automatically and dynamically trigger an alert to the pedestrian. In other embodiments, an on-board computer and/or mobile device associated with a vehicle may receive an indication that a pedestrian is currently nearby and may automatically and dynamically trigger an alert to the pedestrian indicating the current operational mode of the vehicle. In this regard, any pedestrian who receives an alert is afforded the benefit of accurate and relevant data, and may, for instance, quickly take steps to react to the particular operational mode indicated by the alert.

FIG. 1 depicts a block diagram of an exemplary system for alerting a pedestrian of an operational mode of a nearby (e.g., within close proximity of the pedestrian) vehicle. The high-level architecture illustrated in FIG. 1 may include both hardware and software applications, as well as various data communications channels for communicating data between the various hardware and software components, as is described below. The system 100 may be roughly divided into front-end components 102 and back-end components 104.

The front-end components 102 may obtain information regarding a vehicle 106 (e.g., a car, truck, motorcycle, etc.), the surrounding environment, one or more pedestrians 108, 110, an electronic device 112 associated with a pedestrian 110, other nearby vehicles (not shown), etc. The front-end components 102 may include an on-board computer 114 and/or mobile device 116 associated with the vehicle 106, which on-board computer 114 and/or mobile device 116 may be configured to communicate with the back-end components 104 via a network 118. In particular, the on-board computer 114 and/or mobile device 116 may utilize the obtained information to autonomously and/or semi-autonomously operate the vehicle 106. In certain conditions, pedestrian electronic device 112, on-board computer 114, and/or mobile device 116 may further utilize the obtained information to trigger an alert to notify a nearby pedestrian 108, 110 of the current operational mode of the vehicle 106. For instance, the pedestrian electronic device 112, on-board computer 114 and/or mobile device 116 may receive an indication that the vehicle 106 is operating in a particular operational mode (e.g., fully autonomous, semi-autonomous, manual, etc.), and/or that the vehicle 106 and a pedestrian 108, 110 are within close proximity of one another. In such conditions, it may be appropriate to trigger an alert notifying the pedestrian(s) 108, 110 of the operational mode of the nearby vehicle 106. In embodiments, pedestrian electronic device 112, on-board computer 114, and/or mobile device 116 may further cease the triggered alert upon dismissal by a pedestrian 108, 110, when the vehicle 106 switches to another operational mode (e.g., from a manual mode to an autonomous mode), or when the vehicle 106 is no longer within close proximity of one or more pedestrian 108, 110.

The front-end components 102 may further include one or more sensors 120 associated with the vehicle 106 that may communicate sensor data to the on-board computer 114 and/or the mobile device 116. Additionally, the front-end components 102 may include a communication component 122 associated with the vehicle 106 and configured to interface with the on-board computer 114 and/or the mobile device 116 to transmit and receive information from external sources, such as back-end components 104, the pedestrian electronic device 112, other vehicles (not shown), smart infrastructure components, etc. The front-end components 102 may further include an external audio component 124 and/or an external display component 126. The external audio component 124 and/or external display component 126 may be respectively audible or visible from the exterior of the vehicle 106 and configured to respectively sound or display various alerts to alert a nearby pedestrian 108 of the current operational mode of the vehicle 106. Of course, additional or alternative front-end components 102 for performing similar or different functions may be included in various embodiments. Moreover, although just one vehicle 106 and one of most of front-end components 102 are shown in FIG. 1, various embodiments may include any number of vehicles 106 and/or front-end components 102.

Additionally, vehicle 106 may be a vehicle having both autonomous features and manual features, i.e., configured to operate in an autonomous mode (i.e., including a semi-autonomous mode) and/or a manual mode, and further configured to switch between modes. However, in some embodiments, one or more vehicles 106 may be vehicles having only manual operational modes, and/or vehicles having only autonomous operational modes. Moreover, embodiments may include a plurality of vehicles 106, some configured to operate only in manual operational modes, some configured to operate only in autonomous operational modes, and/or some configured to operate in both manual and autonomous operational modes. Of course, in embodiments where one or more vehicles 106 are not configured for autonomous operation, such vehicles 106 may not include all features and functionalities of the on-board computer 114 and/or mobile device 116 described herein. However, such vehicles 106 may still be configured to transmit indications of the current (manual) mode of the vehicle 106 and/or indications of the current location of the vehicle 106.

Generally speaking, as used herein, a pedestrian 108, 110 may be any "bystander" individual not currently in a vehicle. That said, pedestrians 108, 110 may be, for instance, individuals standing, walking, running, or utilizing non-motorized forms of transportation (e.g., bicycles, scooters, etc.). Pedestrians 108, 110 may additionally be close to an area where vehicles may pass by, e.g., walking on a sidewalk by a road. In general, pedestrian 108 may be a pedestrian without an electronic device, or with an electronic device that is powered off, in a silent or do-not-disturb mode, or otherwise not configured to trigger alerts based on the operational mode of a nearby vehicle 106. In some embodiments, the pedestrian 108 may have an electronic device (not shown) configured to transmit location information to a vehicle 106 (e.g., GPS coordinates and/or a short range signal) but not configured to trigger alerts to the pedestrian 108. Accordingly, pedestrian 108 may be alerted of the operational mode of a nearby vehicle 106 via an audible or visible alert emanating from the vehicle 106. For instance, the pedestrian 108 may hear an alert generated by the external audio component 124 (to be discussed in greater detail below), and/or may see an alert generated by the external display component 126 (to be discussed in greater detail below). On the other hand, pedestrian 110 may be a pedestrian with an electronic device 112, configured to trigger alerts based on the operational mode of a nearby vehicle 106. The pedestrian 110 may be notified of the operational mode of the nearby vehicle 106 by a notification of the electronic device 112. For instance, pedestrian 110 may hear, see, and/or feel an alert generated by the electronic device 112. Additionally or alternatively, in some embodiments a pedestrian 110 with an electronic device 112 may be notified of an operational mode of a nearby vehicle 106 by hearing and/or seeing an alert generated by the external audio component 124 and/or external display component 126 of the vehicle 106.

Although one pedestrian 108 without an electronic device and one pedestrian 110 with an electronic device 112 are shown in FIG. 1, embodiments may include any number of pedestrians 108 without electronic devices and pedestrians 110 with electronic devices. Additionally, some embodiments may include no pedestrians 108 without electronic devices, or no pedestrians 110 with electronic devices 112.

In general, electronic device 112 associated with the pedestrian 110 may be any kind of electronic device suitable for triggering alerts to notify the pedestrian 110 of the current operational mode of a nearby vehicle 106. For instance, electronic device 112 may be a dedicated nearby vehicle operational mode notification device, a wearable device such as a fitness tracker or a smart watch, a mobile device such as a mobile phone, and/or a mobile device component such as headphones, to name a few examples. The electronic device 112 may be carried by the pedestrian 110, worn by the pedestrian 110, and/or carried within a bag, purse, and/or luggage of the pedestrian 110, for instance. The electronic device 112 may be configured to communicate with the vehicle 106, and/or any of the front-end components 102 and/or back-end components 104 associated with the vehicle 106 directly over respective links, and/or via the network 118 over respective links.

The electronic device 112 may include various software applications and/or modules for, inter alia, receiving communications and triggering alerts. From the vehicle 106, the front-end components 102 and/or back-end components 104, the electronic device 112 may receive, for instance, indications of the current operational mode of the vehicle 106 and/or the location of the vehicle 106. Accordingly, based on communications received, the electronic device 112 may be configured to trigger an alert to notify the pedestrian 110 of the current operational mode of the vehicle 106. In embodiments, the alert may be, for instance, text or images displayed on a screen of the electronic device 112, or a sound, light, or vibration generated by the electronic device 112. Of course, in some embodiments the alert may be a combination of a visual, audible, or vibrational alert, and/or any other suitable alert for notifying a pedestrian of the current operational mode of a nearby vehicle. In some embodiments, the pedestrian may, via a user interface of the electronic device 112, select preferences for the circumstances (e.g., proximity of nearby vehicle, operational mode of nearby vehicle, etc.) triggering the alert, and/or the mode (e.g., audio, visual, vibrate, etc.) of triggering for the alert.

In some embodiments, the electronic device 112 may be configured to trigger the alert only when the vehicle 106 is currently operating in a particular operational mode. For instance, the alert may be triggered only when the current operational mode of the vehicle 106 is autonomous, or only when the current operational mode of the vehicle 106 is manual. Moreover, in some embodiments the electronic device 112 may be configured to trigger the alert only when the vehicle 106 is within close proximity of the electronic device 112 (i.e., by proxy, the pedestrian 110). Accordingly, in some configurations the electronic device 112 may receive an indication (e.g., from a GPS component 252, to be discussed in greater detail below) of the current location of the electronic device 112, and may, via a processor (e.g. processor 268), determine whether the distance between the current location of the electronic device 112 and the current location of the vehicle 106 is within a certain threshold distance (e.g., one mile, one block, 100 feet, etc.). In other configurations, the electronic device 112 may receive an indication of the current operational mode of the vehicle 106 via a short-range signal from the vehicle 106, indicating that the vehicle 106 is within close proximity of the electronic device 112 because it is within signal range. For instance, if a particular short-range signal were known to only transmit within 100 feet, the electronic device 112, by receiving such a short-range signal from the vehicle 106, may determine an indication that the vehicle 106 is within 100 feet of the electronic device 112.

Furthermore, the electronic device 112 may receive (periodically, continuously, or upon request) additional communications from the vehicle 106, its associated front-end components 102 and/or its associated back-end components 104, including, for instance, updated indications of the current operational mode and/or current location of the nearby vehicle 106. Based on the updated indications, electronic device 112 may in some embodiments cease the alert when the vehicle 106 is no longer in the particular operational mode or is no longer within the certain proximity of the vehicle 106. In additional or alternative configurations, the electronic device 112 may cease the alert upon receiving an indication of a dismissal by the pedestrian 110. For instance, the pedestrian 110 may indicate dismissal via a user interface (e.g., user interface unit 262) or via a voice command or gesture detectable by sensors which may be disposed at the electronic device 112. In some embodiments, the pedestrian may, e.g., via a user interface of the electronic device 112, select preferences for the mode (e.g., via a user interface, voice command, gesture, etc.) of dismissal of the alert. Moreover, the electronic device 112 may be configured to trigger a second alert to notify the pedestrian 110 of a switched operational mode of the vehicle 106 (e.g., to notify the pedestrian that the vehicle has switched from operating in a manual mode to operating in an autonomous mode, or vice versa). In such embodiments, the second alert may be the same or similar to the original alert, or may be different from the original alert (e.g., the original alert may be a beeping sound, while the second alert may be a vibration).

Although just one electronic device 112 is shown in FIG. 1, any number of electronic devices 112 associated with various pedestrians 110 may be included in various embodiments. The electronic devices 112 associated with various pedestrians 110 may be of the same type or of various types. For instance, one pedestrian 110 may wear a smart watch 112, while another pedestrian 110 may carry a mobile phone 112, as one example. Additionally or alternatively, multiple electronic devices 112 and/or multiple electronic device components may be associated with a particular pedestrian 110.

Moving on to the front-end components 102, the on-board computer 114 associated with the vehicle 106 may be, for instance, a general-use computer capable of performing many functions relating to vehicle operation or a dedicated computer for autonomous vehicle operation, in various embodiments. Further, the on-board computer 114 may be installed by the manufacturer of the vehicle 106 or as an aftermarket modification or addition to the vehicle 106. The mobile device 116 may be, for instance, a general-use personal computer, cellular phone, smart phone, tablet computer, smart watch, wearable electronics, a dedicated vehicle monitoring or control device, or any other suitable mobile device. Either or both of the on-board computer 114 and/or the mobile device 116 may run various applications for collecting, generating, processing, analyzing, transmitting, receiving, and/or acting upon data associated with the vehicle 106 (e.g., sensor data; location data; operator or passenger data including selections, dismissals, and/or settings by operators or passengers; autonomous operation feature settings; autonomous operational modes; control decisions made by the autonomous operation features; etc.), the vehicle environment, nearby pedestrians 108, 110, external electronic devices such as electronic device 112, and/or other nearby vehicles. Either or both of the on-board computer 114 and/or the mobile device 116 may communicate with the network 118 over respective links. Additionally or alternatively, the on-board computer 114 or the mobile device 116 may communicate with one another, with the vehicle components 120, 122, 124, 126, with the back-end components 104, and/or with electronic device 112 directly over respective links.

In particular, the on-board computer 114 and/or mobile device 116 may directly or indirectly control the operation of the vehicle 106 according to various autonomous operation features. The autonomous operation features may include software applications or modules implemented by the on-board computer 114 and/or mobile device 116 to generate and implement control commands to control the operation of the vehicle 106 (e.g., steering, braking, throttle, etc.). To facilitate such control, the on-board computer 114 and/or mobile device 116 may be communicatively connected to control components of the vehicle 106 by various electrical or electromechanical control components (not shown). Control commands may be generated by the on-board computer 114 and/or mobile device 116 and may be communicated to the control components of the vehicle 106 to effect a control action. In embodiments involving fully autonomous vehicles and/or fully autonomous operational modes, the vehicle 106 may be operable only through such control components. In other embodiments (e.g., involving semi-autonomous vehicles and/or semi-autonomous operational modes), the control components may be disposed within or supplement other vehicle operator control components (not shown), such as steering wheels, accelerator or brake pedals, or ignition switches controlled by an operator of the vehicle 106.

In some embodiments, the on-board computer 114 and/or mobile device 116 may be configured to transmit (e.g., via a network 118 and/or via a communication component 122) an indication of the current operational mode of the vehicle 106 and/or the location of the vehicle 106 to electronic devices 112 associated with pedestrians 110. The on-board computer 114 and/or mobile device 116 may include various software applications and/or modules implemented by the on-board computer 114 and/or mobile device 116 for communication of such indications. As discussed above, the electronic devices 112 may accordingly trigger alerts for pedestrians 110 with which they are associated. The on-board computer 114 and/or mobile device 116 may transmit such indications periodically (e.g., every minute, every five minutes), constantly, upon request from an electronic device 112, and/or when the operational mode of the vehicle 106 changes, for instance.

In additional or alternative embodiments, the on-board computer 114 and/or mobile device 116 associated with the vehicle 106 may be configured to trigger alerts for nearby pedestrians 108. The on-board computer 114 and/or mobile device 116 may include various software applications and/or modules implemented by the on-board computer 114 and/or mobile device 116 for triggering alerts. Based on indications of the current operational mode of the vehicle 106 and/or the location of the vehicle 106, for instance, the on-board computer 114 and/or mobile device 116 may be configured to trigger an audible and/or visible alert to notify the pedestrian 108 of the current operational mode of the vehicle 106. In embodiments, the alert may be sounded and/or displayed by, e.g., an external audio component 124 and/or external display component 126 with which the on-board computer 114 and/or mobile device 116 may communicatively interface, to be discussed in further detail below.

In some embodiments, the on-board computer 114 and/or mobile device 116 may be configured to trigger the alert only when the vehicle 106 is currently operating in a particular operational mode. For instance, the alert may be triggered only when the current operational mode of the vehicle 106 is autonomous, or only when the current operational mode of the vehicle 106 is manual. Moreover, in some embodiments the on-board computer 114 and/or mobile device 116 may be configured to trigger the alert only when a pedestrian 108 is in close proximity to the vehicle 106. For instance, in some embodiments, the sensors 120 (with which the on-board computer 114 and/or mobile device 116 may interface) associated with the vehicle 106 may be configured to detect nearby pedestrians 108. The on-board computer 114 and/or mobile device 116 may accordingly trigger alerts to notify the detected nearby pedestrians 108 of particular operational modes of the vehicle 106.

In configurations where the pedestrian 108 is associated with some kind of electronic device (not shown) configured to transmit indications of location (e.g., GPS coordinates), the on-board computer 114 and/or mobile device 116 may receive the location of the pedestrian 108 by proxy via the electronic device (not shown). The on-board computer 114 and/or mobile device 116 may further include a GPS module, and may, via a processor, determine the distance between the current location of the vehicle 106 and the current location of the pedestrian 108. The processor may further be configured to determine whether the distance between the current location of the vehicle 106 and the current location of the pedestrian 108 is within a certain threshold distance (e.g., one mile, one block, 100 feet, etc.). In other configurations, the on-board computer 114 and/or mobile device 116 may determine the location of the pedestrian 108 via a short-range signal from an associated electronic device (not shown), indicating that the pedestrian is within close proximity of the vehicle 106 because it is within signal range. For instance, if a particular short-range signal were known to only transmit within 100 feet, the on-board computer 114 and/or mobile device 116 receiving such a short-range signal from the electronic device (not shown) associated with the pedestrian 108 may indicate that the pedestrian is within 100 feet of the vehicle 106. Of course, all of these functionalities may also be enabled to trigger audible or visible alerts via the vehicle 106 for pedestrians 110 in various embodiments.

In some embodiments, the on-board computer 114 and/or mobile device 116 may cease the alert when the vehicle 106 is no longer operating in the particular operational mode (e.g., no longer operating in the manual operational mode, or no longer operating in the autonomous operational mode). Moreover, in some embodiments, the on-board computer 114 and/or mobile device 116 may periodically receive updated indications of the location of the pedestrian 108 and may cease the alert when the vehicle 106 is within the certain proximity of a pedestrian 108. Additionally or alternatively, in some embodiments, the on-board computer 114 and/or mobile device 116 may be configured to trigger a second alert to notify the pedestrian 108 of a switched operational mode of the vehicle 106 (e.g., to notify the pedestrian that the vehicle has switched from operating in a manual mode to operating in an autonomous mode, or vice versa). In such embodiments, the second alert may be the same or similar to the original alert, or may be different from the original alert.

Although only one on-board computer 114 and only one mobile device 116 are depicted in FIG. 1, it should be understood that some embodiments may include, for instance, a plurality of on-board computers 114 (which may be installed at one or more locations within the vehicle 106) and/or a plurality of mobile devices 116. In embodiments, such a plurality of on-board computers 114 or mobile devices 116 may perform functionalities described herein as being performed by just one on-board computer 114 or just one mobile device 116. Additionally, in some embodiments the mobile device 116 may supplement the functions performed by the on-board computer 114 described herein, or vice versa. In other embodiments, the on-board computer 114 and the mobile device 116 may be integrated into a single device, or either may perform the functions of both. In some embodiments or under certain conditions, on-board computer 114 or mobile device 116 may function as thin-client devices that outsource some or most of the processing to the back-end components 104.

As mentioned above, the on-board computer 114 and/or mobile device 116 disposed at the vehicle 106 may communicatively interface with the one or more on-board sensors 120. The one or more on-board sensors 120 may detect conditions associated with the vehicle 106 and/or associated with the environment in which the vehicle 106 is operating, and may collect data indicative of the detected conditions. In particular, data detected by the sensors 120 may be communicated to the on-board computer 114 or the mobile device 116 for autonomous vehicle operation and/or for triggering alerts for nearby pedestrians 108, 110. In some embodiments, the sensors 120 may detect when one or more pedestrian 108, 110 is near the vehicle, and when no pedestrian 108, 110 is near the vehicle, from which data the on-board computer 114 and/or mobile device 116 may cease or modify alerts accordingly.

The sensors 120 may include, for instance, one or more of a GPS unit, a radar unit, a LIDAR unit, an ultrasonic sensor, an infrared sensor, an inductance sensor, a camera, an accelerometer, a tachometer, or a speedometer. Some of the sensors 120 (e.g., radar, LIDAR, or camera units) may actively or passively scan the vehicle environment for pedestrians 108, 110, obstacles (e.g., other vehicles, buildings, etc.), roadways, lane markings, signs, or signals. Other of the sensors 120 (e.g., GPS, accelerometer, or tachometer units) may provide data for determining the location or movement of the vehicle 106. Other sensors 120 may be directed to the interior or passenger compartment of the vehicle 106, such as cameras, microphones, pressure sensors, thermometers, or similar sensors to monitor the vehicle operator and/or passengers within the vehicle 120. Of course, other embodiments may include additional or alternative sensors 120.

In some configurations, at least some of the on-board sensors 120 may be removably or fixedly disposed at various locations on the vehicle 106. Additionally or alternatively, at least some of the on-board sensors 120 may be incorporated within or connected to the on-board computer 114. Still additionally or alternatively, in some configurations, at least some of the on-board sensors 120 may be included on or within the mobile device 116.

Additionally, the on-board computer 114 and/or mobile device 116 disposed at the vehicle 106 may communicatively interface with the one or more communication components 122. The one or more communication components 122 may be configured to transmit information to and receive information from the back-end components 104 and/or from other external sources, such as electronic device 112, other vehicles (not shown) and/or infrastructure or environmental components (not shown) disposed within the environment of the vehicle 106. The one or more communication components 122 may include one or more wireless transmitters or transceivers operating at any desired or suitable frequency or frequencies. Different wireless transmitters or transceivers may operate at different frequencies and/or by using different protocols, if desired.

In an example, the on-board computer 114 may operate in conjunction with a communication component 122 that is disposed at the vehicle 106 for sending or receiving information to and from the back-end components 104 via the network 118, such as over one or more radio frequency links or wireless communication channels which support the first communication protocol and/or a second communication protocol. Additionally or alternatively, the electronic device

112 and/or the mobile device 116 may include respective communication units 254, 204 (depicted in FIG. 2 and discussed below in greater detail) for sending or receiving information to and from the server via the network 118, such as over one or more radio frequency links or wireless communication channels supporting a first communication protocol (e.g., GSM, CDMA, LTE, one or more IEEE 802.11 Standards such as Wi-Fi, WiMAX, BLUETOOTH, etc.). In some embodiments, the on-board computer 114 may operate in conjunction with the mobile device 116 to utilize the communication component 204 of the mobile device 116 to deliver information to the back-end components 104. In some embodiments, the on-board computer 114 may operate in conjunction with the mobile device 116 to utilize the communication component 122 of the vehicle 106 to deliver information to the back-end components 104. In some embodiments, one or more communication components 122 may be utilized by both the on-board computer 114 and/or the mobile device 116 to communicate with the back-end components 104. Accordingly, either one or both of the on-board computer 114 or mobile device 116 may communicate with the network 118 over various links. Additionally, in some configurations, the on-board computer 114 and/or mobile device 116 may communicate with one another directly over a wireless or wired link.

Moreover, the on-board computer 114 and/or the mobile device 116 of the vehicle 108 may communicate with the electronic device 112 associated with pedestrian 110 either directly or via the network 118. For example, the on-board computer 114 and/or the mobile device 116 disposed at the vehicle 106 may communicate with the electronic device 112 via the network 118 and one or more communication components/units 122, 204 by using one or more suitable wireless communication protocols (e.g., GSM, CDMA, LTE, one or more IEEE 802.11 Standards such as Wi-Fi, WiMAX, BLUETOOTH, etc.). As another example, the on-board computer 114 may communicate with an electronic device 112 directly in a peer-to-peer (P2P) manner via one or more of the communication components 122 and a direct wireless communication link which may utilize, for example, a Wi-Fi direct protocol, a BLUETOOTH or other short range communication protocol, an ad-hoc cellular communication protocol, or any other suitable wireless communication protocol. Of course, in various embodiments, the on-board computer 114 and/or mobile device 116 may communicate with any electronic devices (not shown) associated with pedestrian 108 in any of the foregoing ways.

In some embodiments, the one or more communication components 122 may be removably or fixedly disposed at various locations within or external to the vehicle 106. Additionally or alternatively, one or more communication component 122 may be incorporated within or connected to the on-board computer 114. Still additionally or alternatively, in some configurations, one or more communication component 122 may be included on or within the mobile device 116.

Additionally, the on-board computer 114 and/or mobile device 116 disposed at the vehicle 106 may communicatively interface with one or more external audio components 124. The external audio component 124 may be, for instance, a speaker system or other audio device disposed at the vehicle 106, configured to generate alerts audible outside the vehicle 106. The alerts generated by the external audio component 124 may be, for instance, verbal announcements or warnings, and/or various sounds, such as sirens, beeping, music, a continuous tone, etc., or any combination of the foregoing. In particular, the external audio component 124 may be configured to sound various alerts triggered by the on-board computer 114 and/or mobile device 116 for alerting a pedestrian 108 of the operational mode of the vehicle 106. For instance, the external audio component 124 may be configured to sound an alert to a nearby pedestrian 108 when the vehicle 106 is operating in a particular operational mode (e.g., only when the vehicle 106 is operating in a manual operational mode, or only when the vehicle 106 is operating in an autonomous operational mode, for instance). As another example, the external audio component 124 may be configured to sound a second alert in certain instances, such as when the vehicle 106 switches from one operational mode to another. Furthermore, in some embodiments the external audio component 124 may be configured to cease the alert in certain instances, such as when the vehicle 106 switches operational modes, or when the pedestrian 108 (i.e., the electronic device 112) is no longer near the vehicle 106.

In some embodiments, for instance, the external audio component 124 may be itself external to the vehicle 106, while in other embodiments the external audio component 124 may be internal to the vehicle 106 but configured to generate alerts audible to pedestrians 108, 110 external to the vehicle 106. In various configurations, the one or more external audio components 124 may be removably or fixedly disposed at various locations within or external to the vehicle 106. Additionally or alternatively, the external audio component 124 may be incorporated within or connected to the on-board computer 114. Still additionally or alternatively, in some configurations, the external audio component 124 may be included on or within the mobile device 116.

Additionally, the on-board computer 114 and/or mobile device 116 disposed at the vehicle 106 may communicatively interface with one or more external display components 126. The external display component 126 may be, for instance, a light or a display screen disposed at the vehicle 106, configured to generate alert lights or displays visible outside the vehicle 106. The alerts generated by the external display component 126 may be, for instance, verbal or graphical announcements or warnings, and/or various lights, such as lights that blink or flash or appear in various colors, etc., or any combination of the foregoing. In particular, the external display component 126 may be configured to display various alerts triggered by the on-board computer 114 and/or mobile device 116 for alerting a pedestrian 108 of the operational mode of the vehicle 106. For instance, the external display component 126 may be configured to display an alert visible to a nearby pedestrian 108, 110 when the vehicle 106 is operating in a particular operational mode (e.g., only when the vehicle 106 is operating in a manual operational mode, or only when the vehicle 106 is operating in an autonomous operational mode, for instance). As another example, the external display component 126 may be configured to display a second alert in certain instances, such as when the vehicle 106 switches from one operational mode to another. Furthermore, in some embodiments the external display component 126 may be configured to cease the displayed alert in certain instances, such as when the vehicle 106 switches operational modes, or when the pedestrian 108 (i.e., the electronic device 112) is no longer nearby the vehicle 106.

In some embodiments, for instance, the external display component 126 may be itself external to the vehicle 106, while in other embodiments the external display component 126 may be internal to the vehicle 106 but configured to generate alerts visible to pedestrians 108 external to the vehicle 106 (e.g., a display visible through a window of the vehicle, for instance). In various configurations, the one or more external display components 126 may be removably or fixedly disposed at various locations within or external to the vehicle 106. Additionally or alternatively, the external display component 126 may be incorporated within or connected to the on-board computer 114. Still additionally or alternatively, in some configurations, the external display component 126 may be included on or within the mobile device 116. In some embodiments, only the external audio component(s) 124 or external display component(s) 126 may be included for alerting nearby pedestrians, while in other embodiments one or more of both the external audio component(s) 124 and the external display component(s) 126 may be included. Moreover, in embodiments where both types of components 124, 126 are included, the alert may in some configurations be a combination of an audible and visible alert.

As discussed above, the front-end components 102 of the system 100 may communicate with one or more back-end components 104 (e.g., via the network 118). The back-end components 104 may include one or more servers 150. As shown in FIG. 1, the server 150 may include a controller 152 that may be operatively connected to one or more databases 154 via a link, which may be a local or a remote link. The one or more databases 154 may be adapted to store data related to, for instance, pedestrian alert features, autonomous operation features, and/or communication features of the vehicle 106. It should be noted that, while not shown, additional databases may be linked to the controller 152 in a known manner. For example, separate databases may be used for various types of information, such as autonomous operation feature information, vehicle operation information, mapping/location information, weather information, road conditions, information indicating the prevalence of autonomous vehicle operation compared with manual vehicle operation in various areas, information indicating conditions in which autonomous vehicle operation compared with manual vehicle operation is more risky/dangerous, and/or any other suitable types of information. Additional databases (not shown) may be communicatively connected to the server 150 via the network 118, such as databases maintained by third parties (e.g., weather, construction, mapping, and/or road network databases). The controller 152 may include one or more program memories 156, one or more processors 158 (which may be, e.g., microcontrollers and/or microprocessors), one or more random-access memories (RAMs) 160, and/or an input/output (I/O) circuit 162, all of which may be interconnected via an address/data bus.

The server 150 may further include a number of various software applications 164 stored in the program memory 156. Generally speaking, the applications may perform one or more functions related to, inter alia, autonomous or semi-autonomous operation of the vehicle 106, alerting pedestrians 108, 110 of current operational mode of the vehicle 106, and/or communications between the vehicle 106 and external sources, such as, e.g., electronic devices 112 associated with pedestrians 108, 110. For example, one or more of the applications 164 may perform at least a portion of any of the methods described herein, such as, e.g., methods 300 or 400.

The various software applications on the server 150 may include, for example, an application for supporting autonomous and/or semi-autonomous vehicle operations and/or one or more other applications which may support vehicle operations (whether autonomous, semi-autonomous, or manual); a vehicle monitoring application for receiving sensor data indicative of the operational mode of the vehicle 106; an application for transmitting data indicative of the operational mode (e.g., autonomous, semi-autonomous, or manual) and/or switches in the operational mode of the vehicle 106 to the electronic device 112 periodically, constantly, or upon request; an application for receiving data indicative of the location of the vehicle 106; an application for transmitting data indicative of the location of the vehicle 106 to the electronic device 112 periodically, constantly, or upon request; an application for receiving and/or processing data indicative of the location of pedestrians 108 and/or their electronic devices (not shown) to periodically, constantly, or upon request; an application for determining the proximity of pedestrians 108, 110 to vehicle 106, including when pedestrians 108, 110 are in close proximity of the vehicle 106; an application for triggering alerts configured to be audible and/or visible to nearby pedestrians 108 based on the current operational mode of the vehicle 106 and/or the proximity of the pedestrian 108; an application for transmitting alerts to the electronic device 112; an application for displaying a user interface for conveying information to and/or receiving input from an operator and/or passenger of the vehicle 106; an environmental monitoring application for receiving data indicative of conditions in which the vehicle 106 is operating, including nearby pedestrians 108, 110; and/or a real-time communication application for communicating information and/or instructions to the front-end components 102, to electronic devices 112, and/or to other external computing systems. Of course, this is not an exhaustive list of the applications 164, and various embodiments and configurations may include additional and/or alternative applications 164.

The various software applications 164 may be executed on the same computer processor 158 or on different computer processors. It will be understood that there may be any number of software applications 164. Further, two or more of the various applications 164 may be integrated as a combined application, if desired.

It should be appreciated that although the server 150 is illustrated as a single device in FIG. 1, one or more portions of the server 150 may be implemented as one or more storage devices that are physically co-located with the server 150, or as one or more storage devices utilizing different storage locations as a shared database structure (e.g. cloud storage). In some embodiments, the server 150 may be configured to perform any suitable portion of the processing functions remotely that have been outsourced by one or more of on-board computer 114 and/or mobile device 116. In such embodiments, the server 150 may receive and process the data and send an indication to on-board computer 114 and/or mobile device 116, and/or take other actions.

Moreover, although only one processor 158 is shown, the controller 152 may include multiple processors 158. Similarly, the memory of the controller 152 may include multiple program memories 156 and multiple RAMs 160. Although the I/O circuit 162 is shown as a single block, it should be appreciated that the I/O circuit 162 may include a number of different types of I/O circuits. The program memory 156 and RAM 160 may be implemented as semiconductor memories, magnetically readable memories, optically readable memories, or biologically readable memories, for example. Generally speaking, the program memory 156 and/or the RAM 160 may respectively include one or more non-transitory, computer-readable storage media. The controller 152 may also be operatively connected to the network 118 via a link.

Figure 2:
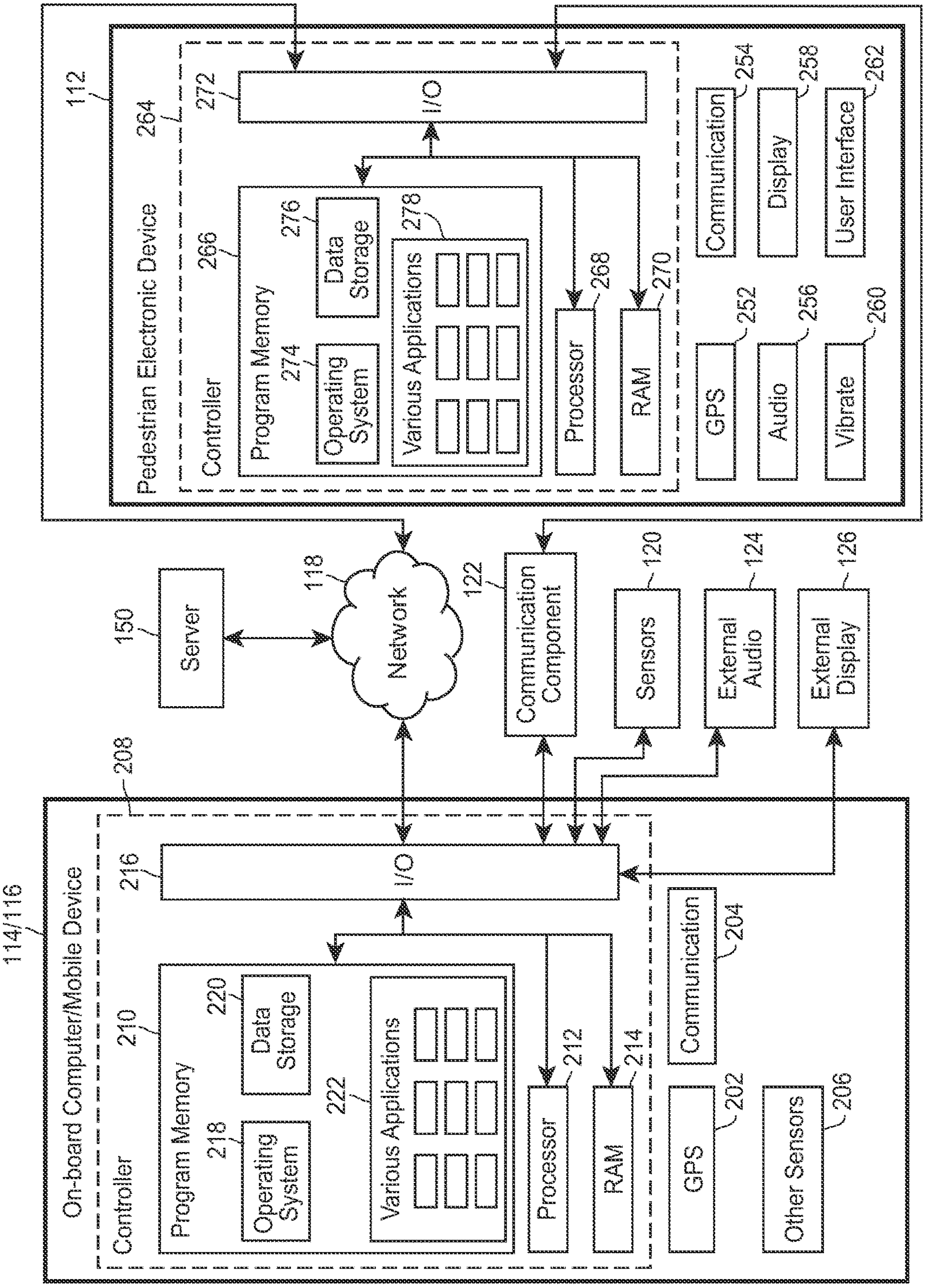
FIG. 2 depicts a block diagram of an exemplary on-board computer and/or mobile device associated with a nearby vehicle, in communication with an electronic device associated with a pedestrian, configured to alert the pedestrian of the current operational mode of the vehicle.

FIG. 2 depicts a block diagram of an exemplary on-board computer/mobile device 114/116 associated with the vehicle

106 and in communication (as discussed above) with one or more electronic devices 112 associated with a pedestrian 110, consistent with the system 100, in which systems and methods for alerting a pedestrian of the current autonomous mode of a nearby vehicle 106 may be implemented. The on-board computer 114 and/or electronic device 116 may include, inter alia, a GPS unit 202, a communication unit 204, various other sensors 206, and/or a controller 208.

The GPS unit 202 may be disposed at the on-board computer 114 and/or mobile device 116 and may collect data indicating the location of the on-board computer 114, the mobile device 116, and/or (e.g., by proxy) the vehicle 106. This location information may be transmitted to the electronic device 112. Additionally or alternatively, this location information may be used, for instance, to determine the proximity of the vehicle 106 to an electronic device 112 associated with a pedestrian 110. Certain alerts may be generated for pedestrians 108, 110 based on the proximity of the pedestrians 108, 110 and/or the proximity of their associated electronic devices 112 to the vehicle (e.g., based on whether the distance between the vehicle 106 and pedestrians 108, 110 and/or electronic device 112 is shorter than a certain distance threshold). In some embodiments, such alerts may be ceased when pedestrians 108, 110 and/or their associated electronic devices 112 are determined to be further away (e.g., outside of a certain distance threshold) from vehicle 106. In additional or alternative instances, the indications of location generated by the GPS unit 202 may be used for autonomous operational features and/or mapping features of the vehicle 106. Of course, additional or alternative uses of the GPS unit 202 may be envisioned. Moreover, in some embodiments the GPS unit 202 may be a separate device disposed within or external to the vehicle 106, and interfacing with the on-board computer 114 and/or mobile device 116.

The communication unit 204 may be disposed at the on-board computer 114 and/or mobile device 116 and may be configured to communicate with, for instance, the back-end components 104 and/or external devices such as the electronic device 112. In general, the communication unit 204 may function similarly to the communication component 122 described above with respect to FIG. 1. In embodiments, the communication component 204 may supplement and/or replace one of the communication components 122. Similarly, the sensors 206 may be disposed at the on-board computer 114 and/or mobile device 116 and may function similarly to the sensors 120 discussed above with respect to FIG. 1. The sensors 206 may supplement and/or replace one or more of the corresponding sensors 120.

The controller 208 may include a program memory 210, one or more processors (e.g., microprocessors) 212, RAM 214, and an I/O circuit 216, all of which may be interconnected via an address/data bus. The program memory 210 may include an operating system 218, a data storage 220, and/or a plurality of various software applications 222. The operating system 218, for example, may include one of a plurality of general purpose or mobile platforms, such as the Android™, iOS®, or Windows® systems, developed by Google Inc., Apple Inc., and Microsoft Corporation, respectively. Alternatively, the operating system 218 may be a custom operating system designed for autonomous vehicle operation and/or triggering alerts for pedestrians using the on-board computer 114 and/or mobile device 116. The data storage 220 may include data such as user profiles and preferences, application data and/or routine data for the various applications 222, and other data related to pedestrian alert features, autonomous operation features, and/or communication features. In some embodiments, the controller 208 may also include, or otherwise be communicatively connected to, other data storage mechanisms (e.g., one or more hard disk drives, optical storage drives, solid state storage devices, etc.) residing within the vehicle 106.

In embodiments, the controller 208 may include multiple program memories 210, processors 212 and/or RAMs 214. Moreover, although FIG. 2 depicts the I/O circuit 216 as a single block, the I/O circuit 216 may include a number of different types of I/O circuits. The controller 208 may implement the program memories 210 and/or the RAMs 214 as semiconductor memories, magnetically readable memories, or optically readable memories, for example. Generally speaking, the program memories 210 and/or the RAMs 214 may respectively include one or more non-transitory, computer-readable storage media. The one or more processors 212 may be adapted and configured to execute any of the various software applications 222 residing in the program memory 210, in addition to other software applications/routines.

Generally speaking, the applications 222 may perform one or more functions related to, inter alia, autonomous or semi-autonomous operation of the vehicle 106, triggering alerts to notify nearby pedestrians 108 of the current operational mode of the vehicle 106, and/or communications between the vehicle 106 and external sources, such as, e.g., the back-end components 104 and/or electronic devices 112 associated with pedestrians 110. For example, one or more of the applications 228 may perform at least a portion of any of the methods described herein, such as, e.g., method 400, to be discussed in greater detail below.

The various software applications 222 may include, for example, an application for supporting autonomous and/or semi-autonomous vehicle operations and/or one or more other applications which may support vehicle operations (whether autonomous, semi-autonomous, or manual); a vehicle monitoring application for receiving sensor data indicative of the operational mode of the vehicle 106; an application for transmitting data indicative of the operational mode (e.g., autonomous, semi-autonomous, or manual) and/or switches in the operational mode of the vehicle 106 to the electronic device 112 periodically, constantly, or upon request; an application for receiving data indicative of the location of the vehicle 106; an application for transmitting data indicative of the location of the vehicle 106 to the electronic device 112 periodically, constantly, or upon request; an application for receiving and/or processing data indicative of the location of pedestrians 108 and/or their electronic devices (not shown) to periodically, constantly, or upon request; an application for determining the proximity of pedestrians 108, 110 to vehicle 106, including when pedestrians 108, 110 are in close proximity of the vehicle 106; an application for triggering alerts configured to be audible and/or visible to nearby pedestrians 108 based on the current operational mode of the vehicle 106 and/or the proximity of the pedestrian 108; an application for transmitting alerts to the electronic device 112; an application for displaying a user interface for conveying information to and/or receiving input from an operator and/or passenger of the vehicle 106; an environmental monitoring application for receiving data indicative of conditions in which the vehicle 106 is operating, including nearby pedestrians 108, 110; and/or a real-time communication application for communicating information and/or instructions to the back-end components 104, to electronic devices 112, and/or to other external computing systems. Of course, this is not an exhaustive list of the applications 222, and various embodiments and configurations may include additional and/or alternative applications 222.

The various software applications 222 may be executed on the same processor 212 or on different processors. It will be understood that there may be any number of software applications 222. Further, two or more of the various applications 222 may be integrated as a combined application, if desired.

As discussed above, the on-board computer 114 and/or the mobile device 116 associated with the vehicle 106 may communicate with an electronic device 112 associated with a pedestrian 110. The electronic device 112 may include a GPS unit 252, a communication unit 254, an audio unit 256, a display unit 258, a vibrate unit 260, a user interface unit 262, and/or a controller 264.

The GPS unit 252 may be disposed at the electronic device 112 and may collect data indicating the location of the electronic device 112 and/or (e.g., by proxy) the pedestrian 110 with which the electronic device 112 is associated. In some embodiments this location information may be transmitted to the vehicle 106 (i.e., to the on-board computer 114 and/or mobile device 116). This location information may be used, for instance, to determine the proximity of a nearby vehicle 106 to the electronic device 112. Certain alerts (e.g., alerts notifying the pedestrian 110 of the current operational mode of a vehicle 106) may be triggered by the electronic device 112 when a nearby vehicle 106 in a particular operational mode is within a close proximity of the electronic device 112. For instance, when the distance between the location of the electronic device 112, as determined by the GPS unit 252, and the location of the vehicle 106 is within a certain threshold distance (e.g., one mile, one block, 100 feet, etc.), the alert may be triggered. As another example, when the distance between the location of the electronic device 112 and the location of the vehicle 106 is greater than the threshold distance, the alert may not be triggered, or may be ceased if it had previously been triggered. In some additional or alternative embodiments, the location information detected by the GPS unit 252 may be transmitted (e.g., via the network 118 and/or by the communication unit 254) to the on-board computer 114 and/or mobile device 116 associated with the vehicle 106. Of course, other additional or alternative uses of the GPS unit 252 may be envisioned. Moreover, in some embodiments the GPS unit 252 may be a separate device from the electronic device 112, e.g., a component of the electronic device 112, such as, e.g., a "smart watch" in short range (e.g., Bluetooth) communication with the electronic device 112.

The communication unit 254 may be disposed at the electronic device 112 and may be configured to transmit information to and receive information from external devices such as the on-board computer 114, mobile device 116, and/or server 150 associated with the vehicle 106, and/or external databases (not shown). The communication unit 254 may include one or more wireless transmitters or transceivers operating at any desired or suitable frequency or frequencies. Different wireless transmitters or transceivers may operate at different frequencies and/or by using different protocols, if desired. The communication unit 254 may send or receive information via the network 118, such as over one or more radio frequency links or wireless communication channels which support a one or more communication protocol (e.g., GSM, CDMA, LTE, one or more IEEE 802.11 Standards such as Wi-Fi, WiMAX, BLUETOOTH, etc.). Additionally, in some configurations, the communication unit 254 of the electronic device 112 may communicate with the external devices directly over a wireless or wired link in a peer-to-peer (P2P) manner which may utilize, for example, a Wi-Fi direct protocol, a BLUETOOTH or other short range communication protocol, an ad-hoc cellular communication protocol, or any other suitable wireless communication protocol.

In particular, the communication unit 254 may receive indications transmitted by the on-board computer 114, mobile device 116, and/or server 150, indicating the current operational mode and/or current location of the vehicle 106. In some embodiments, the communication unit 254 may additionally or alternatively transmit indications to the on-board computer 114, mobile device 116, and/or server 150 indicating the current location of the electronic device 112. In some configurations, the communication unit 254 may communicate with external databases to receive information including, for instance, areas in which autonomous operational modes are prevalent and/or areas in which manual operational modes are prevalent, current weather conditions, current traffic conditions, current construction conditions, etc. Of course, other additional or alternative uses of the communication unit 254 may be envisioned. Moreover, in some embodiments the communication unit 254 may be a separate device from the electronic device 112, e.g., a component of the electronic device 112, such as, e.g., a "smart watch" in short range (e.g., Bluetooth) communication with the electronic device 112.

The audio unit 256 may be, for instance, a speaker disposed at the electronic device 112 or at a component (e.g., headphones) of the electronic device 112, and may be configured to sound audible alerts to notify a user (e.g., pedestrian 110) of the electronic device 112 of the current operational mode of a nearby vehicle 106. In some embodiments, the audio unit 256 may be configured to sound the alert only when the vehicle 106 is operating in a particular operational mode (e.g., only when the vehicle 106 is operating in a manual operational mode, or only when the vehicle 106 is operating in an autonomous operational mode), or only when the vehicle 106 is within close proximity of the electronic device 112. The audio unit 256 may generate various sounds, such as sirens, beeping, music, a continuous tone, etc., to notify the pedestrian of the current operational mode of the nearby vehicle 106. In some embodiments, the audio unit 256 may project a voice reading a warning, e.g., "Warning: Manually operating vehicle nearby." or "Warning: Autonomously operating vehicle nearby." Of course, the audio unit 256 may generate additional or alternative sounds, or any combination of the various sounds discussed above for various alerts.

In some embodiments, the alert may persist until the electronic device 112 receives an indication that the vehicle 106 is no longer in the particular operational mode (e.g., an indication that the vehicle 106 has switched from a manual operational mode to an autonomous operational mode, or vice versa), or is no longer within close proximity of the electronic device 112. In additional or alternative embodiments, the alert may persist until dismissed by a user (e.g., pedestrian 110, via user interface unit 262). Moreover, in some embodiments the audio unit 256 may sound a second alert to notify the pedestrian 110 of a changed operational mode of the vehicle 106. Of course, other additional or alternative uses of the audio unit 256 may be envisioned. Moreover, in some embodiments the audio unit 256 may be (or may be disposed at) a separate device from the electronic device 112 and/or a component of the electronic device 112, e.g., headphones associated with the electronic device 112.

The display unit 258 may be, e.g., a light or screen of the electronic device 112 configured to display visual alerts to notify a user (e.g., pedestrian 110) of the electronic device 112 of the current operational mode of a nearby vehicle 106. As with the audio unit 256, the display unit 258 may in some embodiments be configured to display the alert only when the vehicle 106 is operating in a particular operational mode, or only when the vehicle 106 is within close proximity of the electronic device 112. The display unit 258 may generate, for instance, a light in various colors, a flashing or blinking light, or any other light suitable for notifying the pedestrian 110 of the alert. In some embodiments, the display unit 258 may display symbols or words on a screen to notify the pedestrian 110 of the alert. For instance, the display unit 258 may display a notification including a written warning, e.g., "Warning: Manually operating vehicle nearby." or "Warning: Autonomously operating vehicle nearby." Of course, the display unit 258 may display alternative or additional lights, display screens, or notifications, or any combination of the various lights and displays discussed above for various alerts.

As with the audible alerts discussed above with respect to the audio unit 256, the visible alerts generated by the display unit 258 may persist until the electronic device 112 receives an indication that the vehicle 106 is no longer in the particular operational mode or is no longer within close proximity of the electronic device 112. In additional or alternative embodiments, the visible alert may persist until dismissed by a user (e.g., pedestrian 110). Moreover, in some embodiments the display unit 258 may display a second alert to notify the pedestrian 110 of a changed operational mode of the vehicle 106. Of course, other additional or alternative uses of the display unit 258 may be envisioned. Moreover, in some embodiments the display unit may be (or may be disposed at) a separate device from the electronic device 112 and/or a component of the electronic device 112, e.g., a "smart watch" associated with the electronic device 112.

The vibrate unit 260 may be configured to vibrate to notify a user (e.g., pedestrian 110) of the electronic device 112 of the current operational mode of a nearby vehicle 106. As with the audio unit 256 and/or the display unit 258, the vibrate unit 260 may in some embodiments be configured to display the alert only when the vehicle 106 is operating in a particular operational mode or only when the vehicle 106 is within close proximity of the electronic device 112. Moreover, as with audio unit 256 and/or the display unit 258, the vibrate alerts generated by the vibrate unit 260 may persist until the electronic device 112 receives an indication that the vehicle 106 is no longer in the particular operational mode or is no longer within close proximity of the electronic device 112. In additional or alternative embodiments, the vibrate alert may persist until dismissed by a user. Moreover, in some embodiments the vibrate unit 260 may generate a second alert to notify the pedestrian 110 of a changed operational mode of the vehicle 106. Of course, other additional or alternative uses of the vibrate unit 260 may be envisioned. Moreover, in some embodiments the vibrate unit 260 may be (or may be disposed at) a separate device from the electronic device 112 and/or a component of the electronic device 112 e.g., a "smart watch" associated with the electronic device 112.

While in some embodiments the electronic device 112 may include one or more audio unit 256, one or more display unit 258, and/or one or more the vibrate unit 260, in other embodiments the electronic device may include just one or two of these notification units, or a different notification unit altogether, for notifying a user (e.g., pedestrian 110) of the electronic device 112 of the current operational mode of the nearby vehicle 106. Moreover, in some embodiments a single alert may be generated by multiple of the notification units. For instance, one alert may include a sound, a written warning, and a vibration of the electronic device 112.

The user interface unit 262 may be configured to receive input from the user (e.g., pedestrian 110) of the electronic device 112. In some embodiments this input may include, for instance, dismissal of an alert or notification. In additional or alternative embodiments this input may include selections or preferences of the user. For instance, selections or preferences of the user may include whether the user prefers to be notified only when there is a nearby manually operating vehicle, or only when there is a nearby autonomously operating vehicle, for instance. As another example, selections or preferences of the user may include whether the user prefers to receive an alert only when the nearby vehicle is within a certain proximity distance of the user. That is, the user may indicate a proximity preference such as, e.g., one mile, one block, 100 feet, etc. As an additional example, the selections or preferences of the user may include whether the user prefers to receive a second alert when the nearby vehicle switches modes. Additionally, selections or preferences of the user may include a preference for to enabling or disabling the alert, a preferred type of alert (e.g., audio, visual, vibrate, etc.), and/or how a preferred mode of dismissal (e.g., gesture, voice command, via the user interface unit 262, etc.) for the alert. Of course, other additional or alternative uses of the user interface unit 262 may be envisioned. Moreover, in some embodiments the user interface unit 262 may be (or may be disposed at) a separate device from the electronic device 112 and/or a component of the electronic device 112, e.g., a "smart watch" in communication with the electronic device 112.

The controller 264 may include a program memory 266, one or more processors (e.g., microprocessors) 268, RAM 270, and an I/O circuit 272, all of which may be interconnected via an address/data bus. The program memory 266 may include an operating system 274, data storage 276, and/or a plurality various software applications 278. The operating system 274, for example, may include one of a plurality of general purpose or mobile platforms, such as the Android™, iOS®, or Windows® systems, developed by Google Inc., Apple Inc., and Microsoft Corporation, respectively. Alternatively, the operating system may be a custom operating system designed for communication with a nearby vehicle 106 and/or triggering an alert to notify a pedestrian 110 of the current operational mode of a nearby vehicle 106. The data storage may include data such as user profiles and preferences, application data and/or routine data for the various applications 278, and other data related to driver re-engagement features, autonomous operation features, and/or communication features. In some embodiments, the controller 264 may also include, or otherwise be communicatively connected to, other data storage mechanisms (e.g., one or more hard disk drives, optical storage drives, solid state storage devices, etc.) residing within the vehicle 106.

In embodiments, the controller 264 may include multiple program memories 266, processors 268 and/or RAMs 270. Moreover, although FIG. 2 depicts the I/O circuit 272 as a single block, the I/O circuit 272 may include a number of different types of I/O circuits. The controller 264 may implement the program memories 266 and/or the RAMs 270 as semiconductor memories, magnetically readable memories, or optically readable memories, for example. Generally speaking, the program memories 266 and/or the RAMs 270 may respectively include one or more non-transitory, computer-readable storage media. The one or more processors 268 may be adapted and configured to execute any of the various software applications 278 residing in the program memory 266, in addition to other software applications/routines.

Generally speaking, the applications 278 may perform one or more functions related to, inter alia, alerting a pedestrian 110 of the current operational mode of a nearby vehicle 106, and/or communications between the electronic device 112 and external sources, such as, e.g., the front-end components 102 and/or back-end components 104 of the vehicle 106. For example, one or more of the applications 278 may perform at least a portion of any of the methods described herein, such as, e.g., method 300.

The various software applications 278 may include, for example, an application for requesting and/or receiving indications of the current operational mode of the vehicle 106; an application for requesting and/or receiving indications of the current location of the vehicle 106; an application for determining the current location of the electronic device 112; an application for transmitting the current location of the electronic device 112 to the vehicle 106 (and/or its front- or back-end components 102/104; an application for determining the distance between the electronic device 112 and the vehicle 106; an application for determining whether the distance between the electronic device 112 and the vehicle 106 is greater than or less than a certain threshold distance; an application for triggering alerts to notify the pedestrian 110 of the current operational mode of the vehicle 106 when the vehicle 106 is in a particular operational mode and/or within close proximity of the electronic device 112; an application for receiving dismissals from a user via a user interface 262 and ceasing alerts based on such dismissals; an application for requesting/receiving updated indications of the current operational mode and/or location of the vehicle 106; an application for ceasing alerts when the vehicle 106 switches operational modes and/or is no longer in close proximity of the electronic device 112; an application for receiving user preferences via a user interface 262; and/or an application for receiving data from external databases. Of course, this is not an exhaustive list of the applications 278, and various embodiments and configurations may include additional and/or alternative applications 278.

Moreover, in various embodiments any electronic devices (not shown) associated with pedestrian 108 may include any combination of the foregoing features and/or functionalities of electronic device 112 associated with pedestrian 110. In some embodiments, such electronic devices (not shown) may include additional or alternative functionalities as well.

Figure 3:
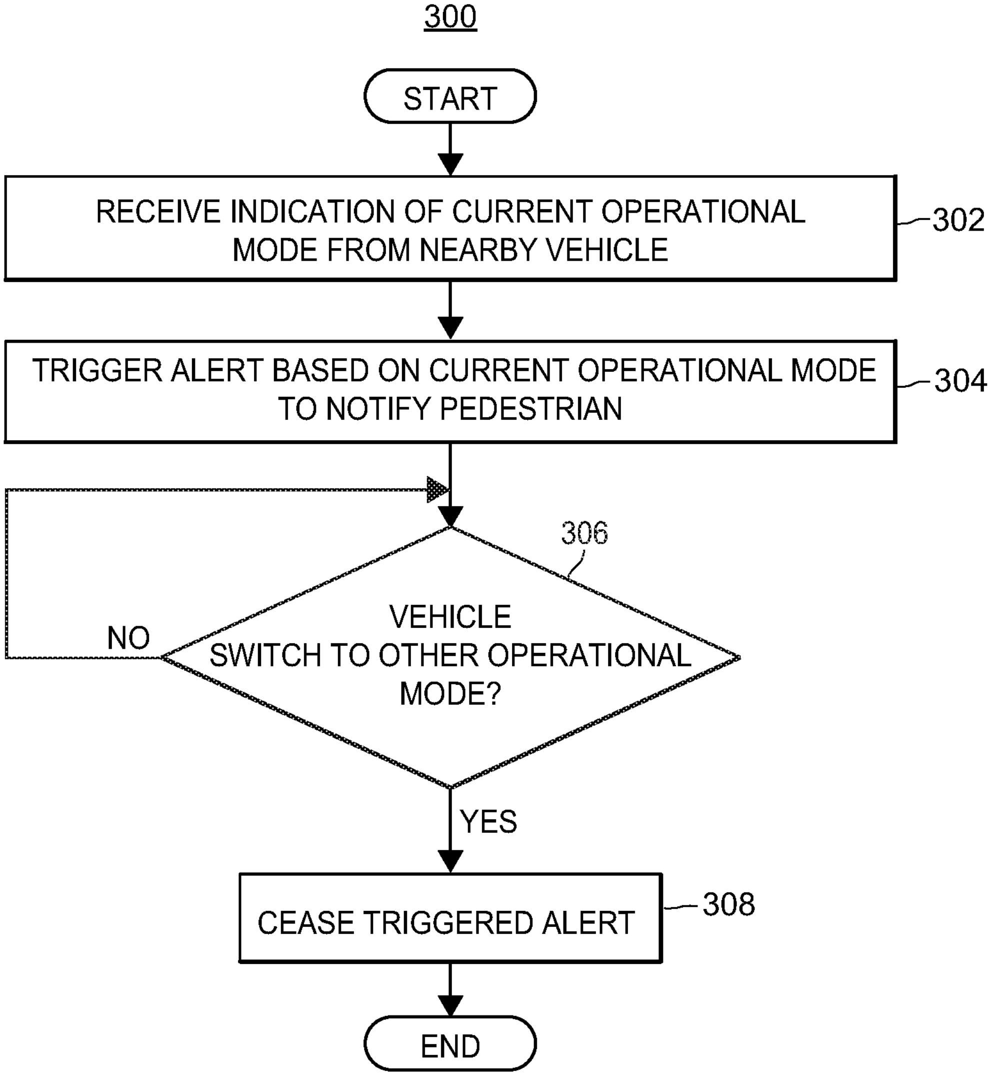
FIG. 3 depicts a flow diagram of an exemplary method for alerting a pedestrian of a current operational mode of a nearby vehicle, by an electronic device associated with the pedestrian.

FIG. 3 depicts an exemplary flow diagram of a method 300 for alerting a pedestrian of an operational mode of a nearby vehicle. Method 300 may be facilitated by an electronic device (e.g., electronic device 112) associated with the pedestrian (e.g., pedestrian 110, or in some embodiments pedestrian 108) which may support execution of a dedicated application that may facilitate the functionalities of the method 300. Further, the electronic device may enable a user (e.g., the pedestrian 110) to make various selections and facilitate various functionalities.

At block 302, an indication of a current operational mode of a nearby vehicle (e.g., vehicle 106) may be received. The nearby vehicle may be configured for various autonomous features and/or modes, and the current operational mode of the nearby vehicle may be, for instance, an autonomous (e.g., fully autonomous or semi-autonomous) or a manual operational mode. In some embodiments, the indication of the current operational mode may be received via a network (e.g., network 118). In additional or alternative embodiments, the indication of the current operational mode of the vehicle may be received via a short-range signal transmitted by the vehicle, or transmitted by an on-board computer (e.g., on-board computer 114), mobile device (e.g., mobile device 116) and/or communication component (e.g., communication component 122) disposed therein.

In some embodiments, the indication of the current operational mode of the nearby vehicle may additionally or alternatively include a location of the vehicle. For instance, the location of the vehicle may be indicated by GPS coordinates of the vehicle, which may be determined by a GPS unit or other alternative location functionality. Additionally, the location of the pedestrian may also be received and/or determined. For instance, the location of an electronic device associated with the pedestrian may be determined (e.g., by a GPS unit 252), indicating the location of the pedestrian by proxy. In some embodiments, the pedestrian may, for instance, input a current location, or input a route to be walked to a future location.

At block 304, an alert may be triggered based on the current operational mode of the nearby vehicle. The alert may be configured to notify the pedestrian of the current operational mode of the vehicle. In embodiments, the triggered alert may be, for instance, one or more of a sound, vibration, light, display, or any other suitable means of alerting a pedestrian. In some embodiments an alert may be triggered only for a particular operational mode. That is, the alert may be triggered only when the current operational mode of the vehicle is manual, or only when the current operational mode of the vehicle is autonomous. Some embodiments may include, for instance, a selection or preference to trigger an alert only when a nearby vehicle is in an autonomous mode, but not in a manual mode, or vice versa. In some embodiments, the selection or preference may be a selection or preference of the pedestrian (e.g., as indicated by pedestrian user input). In other embodiments, the selection or preference may be a pre-set selection or preference, e.g., set by a manufacturer.

In other embodiments, the particular operational mode triggering the alert may be based on the prevalence of autonomously operating vehicles or manually operating vehicles in the area (e.g., based on the location of the electronic device and/or the location of the vehicle). That is, in certain areas (e.g., certain countries, states, cities, neighborhoods, etc.), autonomously operating vehicles may be more prevalent or more common, while in other areas, manually operating vehicles may be more prevalent. In some instances, it may be desirable to trigger an alert when a nearby vehicle is operating in a less prevalent operational mode. E.g., in an area where manually operating vehicles are prevalent, an alert may be triggered when a nearby vehicle is operating in an autonomous operational mode, but in an area where autonomously operating vehicles are prevalent, an alert may be triggered when a nearby vehicle is operating in a manual operational mode. Of course, in other instances it may be desirable to trigger an alert for a certain operational mode even if that operational mode is more prevalent in the area. The prevalence of autonomously and/or manually operating vehicles in a given area may be indicated by information received from other vehicles in the area, or by statistical information received by accessing a database, for instance, or by any other suitable means. In embodiments, the particular operational mode triggering the alert may be changed and/or updated based on changes and/or updates in the location of the pedestrian and/or the vehicle. For instance, as a vehicle and/or pedestrian crosses a border (e.g., of a country, state, city, county, etc.) the particular operational mode triggering the alert may be updated based on the prevalence of autonomously and/or manually operating vehicles in the new location of the vehicle/pedestrian.

As another example, the particular operational mode triggering the alert may be based on external conditions, such as, for instance, the time of day, weather conditions, traffic conditions, and/or road conditions. In some instances, it may be desirable to trigger an alert when a nearby vehicle is operating in a more risky or dangerous operational mode given the external conditions. That is, as one example, it may be desirable to trigger an alert when a nearby vehicle is operating in a manual mode at times of day (e.g., night time), when manual operation may be more risky and/or dangerous (e.g., due to low visibility, potentially sleep-deprived vehicle operator, etc.). As another example, it may be desirable to trigger an alert when a nearby vehicle is operating in an autonomous operational mode in certain weather conditions (e.g., fog, flood, rainstorm, hail, snowstorm, tornado, etc.) when autonomous operation may be more risky and/or dangerous (e.g., due to the unpredictability of these conditions, or due to sensor failure that may occur in these conditions, etc.). Of course, these are only examples, and there may of course be instances in which operating in a manual mode is less risky and/or dangerous at night time and in which an autonomous mode is less risky and/or dangerous in such weather conditions. The indication of one or more external condition may be received by the electronic device associated with the pedestrian (e.g., via sensors (not shown) of the electronic device, via a network 118 in communication with a database of external conditions, via the sensors 120 of the vehicle 106, etc.). In embodiments, the particular operational mode triggering the alert may be changed and/or updated based on changes and/or updates in external conditions.

In some embodiments an alert may be triggered only when the vehicle is sufficiently "nearby" (e.g., within close proximity of the electronic device and/or the pedestrian). In some embodiments, for instance, the alert may be triggered only when the vehicle is within a certain threshold distance (e.g., one block, one mile, etc.) of the electronic device (e.g., when the distance between the nearby vehicle and the electronic device is less than the certain threshold distance). For instance, the current GPS coordinates of the vehicle may be periodically or continuously requested and/or received by the electronic device in order to determine whether the vehicle is sufficiently nearby, i.e., whether an alert may be triggered. In additional or alternative embodiments, the alert may be triggered only when a short-range signal transmitted by the vehicle is received. That is, when a short range signal is received, the vehicle may be nearby, but when a short range signal is no longer received, the vehicle may no longer be nearby.

In some embodiments, only an indication of a nearby vehicle operating in a particular operational mode may trigger the alert (e.g., only a vehicle both nearby and operating in an autonomous operational mode may trigger the alert, or only a vehicle both nearby and operating in a manual operational mode may trigger the alert). In other embodiments, an indication of any sufficiently nearby vehicle may trigger the alert. For instance, in areas or at times where vehicles generally are not prevalent (e.g., rural settings, middle of the night, etc.), it may in some cases be desirable to trigger an alert for notifying a pedestrian of any nearby vehicle and additionally notify the pedestrian of the operational mode of the nearby vehicle.

At block 306, a query may be made as to whether the nearby vehicle has switched to another operational mode (e.g., from an autonomous operational mode to a manual operational mode or vice versa). For instance, indications of the current operational mode of the nearby vehicle may be received continuously or periodically by the electronic device associated with the pedestrian. In some embodiments, the indication of the current operational mode of the nearby vehicle may be received upon request by the electronic device. An updated indication of a current operational mode of the vehicle, different from a previous indication of operational mode of the vehicle, may indicate that the vehicle has switched to another operational mode.

If an indication that the nearby vehicle has switched to another operational mode is received (block 306, YES), the alert may be ceased (block 308). In some embodiments, the triggered alert may additionally or alternatively be ceased when an indication of a dismissal of the notification is received.

Additionally or alternatively, the triggered alert may be ceased (block 308) based on an indication that the vehicle is no longer nearby. That is, in some embodiments, even if the vehicle remains in an operational mode that would otherwise trigger the alert, the alert may be ceased when the vehicle is no longer nearby the pedestrian. In some embodiments, the indication that the vehicle is no longer nearby may be an indication that the distance between the location of the vehicle and the location of the electronic device exceeds the certain threshold distance. In additional or alternative embodiments, the indication that the vehicle is no longer nearby may be based on an indication that a short-range signal transmitted by the vehicle is no longer received by the electronic device.

Moreover, in some embodiments, a second alert may be triggered to indicate that the vehicle has switched to another operational mode. In embodiments, the second alert may be different from the first alert. As one example, when the first alert is a sound, the second alert may be a sound in a different tone. As another example, when the first alert is a sound, the second alert may be a light. Of course, the second alert may be different from the first alert in any number of ways. Alternatively, the second alert may be very similar or exactly the same as the first alert.

Figure 4:
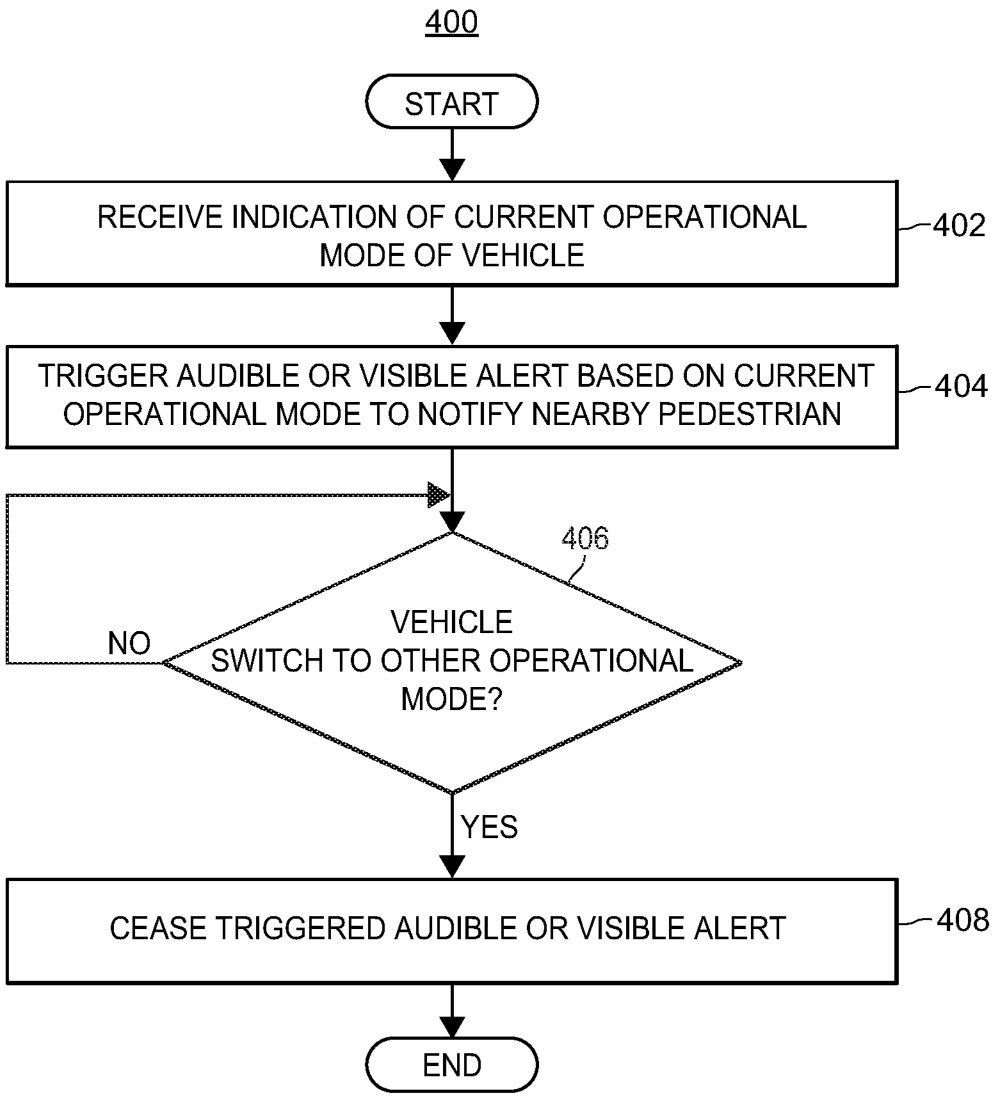
FIG. 4 depicts a flow diagram of an exemplary method for alerting a nearby pedestrian of a current operational mode of a vehicle, by an on-board computer and/or mobile device associated with the vehicle.

FIG. 4 depicts an exemplary flow diagram of a method 400 for alerting a nearby pedestrian of a current operational mode of a vehicle. Method 400 may be facilitated by an on-board computer and/or mobile device associated with a vehicle (e.g., on-board computer and/or mobile device 114/116 associated with vehicle 106), which may support execution of a dedicated application that may facilitate the functionalities of the method 400. Further, the electronic device may enable a user to make various selections and facilitate various functionalities.

At block 402, an indication of a current operational mode of a vehicle (e.g., vehicle 106) may be received. As discussed above, the vehicle may be configured for various autonomous features and/or modes, and the current operational mode of the nearby vehicle may be for instance, an autonomous (e.g., fully autonomous or semi-autonomous) or a manual operational mode. In embodiments, the indication may simply be an internal indication, e.g., an indication generated periodically by an application of the on-board computer and/or mobile device. In embodiments, the indication of the current operational mode may be received from on-board vehicle sensors (e.g., sensors 120) interfacing with the on-board computer and/or mobile device associated with the vehicle. In other embodiments, the operational mode of the vehicle may be controlled remotely, e.g., by a server in communication with the on-board computer and/or mobile device via a network. In such embodiments, the on-board computer and/or mobile device may receive the indication of the current operational mode of the vehicle from the server via the network. In still other embodiments, the on-board computer and/or mobile device may control the operational mode of the vehicle, which case the indication may be received via a selection of an operator or passenger of the vehicle. That is, the operator or passenger of the vehicle may indicate a selection of a particular operational mode to the on-board computer and/or mobile device (e.g., via a user interface, or via a voice command, motion, or gesture which may be detected by an internal sensor), which may in turn cause the vehicle to operate in the indicated operational mode.

At block 404, an audible or visible alert may be triggered based on the current operational mode of the vehicle, to notify a nearby pedestrian of the current operational mode of the vehicle. The alert may be, for instance, a sound, light, and/or display generated by a component located external to the vehicle (e.g., external audio component 124, external display component 126, etc.) and configured to be audible and/or visible to nearby pedestrians. Of course, the component may be within the vehicle in some embodiments (e.g., a light may be located inside a vehicle window but still visible to pedestrians outside the vehicle). Moreover, in some embodiments, the alert may additionally or alternatively be transmitted to an electronic device associated with the pedestrian 112 for notification via that device.

As discussed above, in some embodiments the alert may only be triggered when the vehicle is operating in a particular operational mode (e.g., only when the vehicle is operating in a manual operational mode, or only when the vehicle is operating in an autonomous operational mode), based on, e.g., pre-set settings, a preference or selection of the user (e.g., the operator or passenger of the vehicle), prevalence of a particular operational mode in the area where the vehicle is located, and/or external conditions, for instance.

Additionally, in some embodiments the alert may only be triggered when a pedestrian is sufficiently "nearby" (e.g., within close proximity of the vehicle). For instance, the alert may be triggered only when the vehicle is within a certain threshold distance (e.g., one block, one mile, etc.) of an electronic device of a pedestrian (e.g., when the distance between the nearby vehicle and the electronic device is less than the certain threshold distance). In some embodiments, the current GPS coordinates of pedestrian electronic devices may be periodically or continuously requested and/or received by the on-board computer and/or mobile device of the vehicle in order to determine whether any pedestrians are sufficiently nearby, i.e., whether an alert may be triggered. In additional or alternative embodiments, the alert may be triggered only when a short-range signal transmitted by a pedestrian electronic device is received by the on-board computer and/or mobile device of the vehicle. That is, when a short range signal transmitted by a pedestrian electronic device is received by the on-board computer and/or mobile device of the vehicle, the pedestrian may be nearby, but when a short range signal is no longer received, the pedestrian may no longer be nearby. In further additional or alternative embodiments, the vehicle may include one or more sensors (e.g., sensors 120) configured to detect pedestrians nearby the vehicle. That is, in some embodiments, if one or more pedestrian is detected by the sensors, the alert may be triggered, while if no pedestrian is detected by the sensors, no alert may be triggered.

At block 406, a query may be made as to whether the vehicle has switched to another operational mode (e.g., from an autonomous operational mode to a manual operational mode or vice versa). The query may simply be an internal query as to the current operational mode of the vehicle and a comparison to the previously determined operational mode. If an indication that the nearby vehicle has switched to another operational mode is received (block 406, YES), the alert may be ceased (block 408). In some embodiments, the triggered alert may additionally or alternatively be ceased when an indication of a dismissal of the notification is received.

Additionally or alternatively, the triggered alert may be ceased (block 408) based on an indication that the pedestrian is no longer nearby. That is, in some embodiments, even if the vehicle remains in an operational mode that would otherwise trigger the alert, the alert may be ceased when the pedestrian is no longer nearby the vehicle. In some embodiments, the indication that the pedestrian is no longer nearby may be an indication that the distance between the electronic device associated with the pedestrian and the on-board computer and/or mobile device associated with the vehicle exceeds the certain threshold distance. In additional or alternative embodiments, the indication that the pedestrian no longer nearby may be based on an indication that a short-range signal transmitted by the electronic device associated with the pedestrian is no longer received by the vehicle or any vehicle component configured to receive such short-range signals. In still further embodiments, the indication that the pedestrian is no longer nearby may be based on an indication that no pedestrians have been detected by the sensors associated with the vehicle.

Moreover, in some embodiments, a second alert may be triggered to indicate that the vehicle has switched to another operational mode. In embodiments, the second alert may be different from the first alert. As one example, when the first alert is a sound, the second alert may be a sound in a different tone. As another example, when the first alert is a sound, the second alert may be a light. Of course, the second alert may be different from the first alert in any number of ways. Alternatively, the second alert may be very similar or exactly the same as the first alert.

Figure 5A:
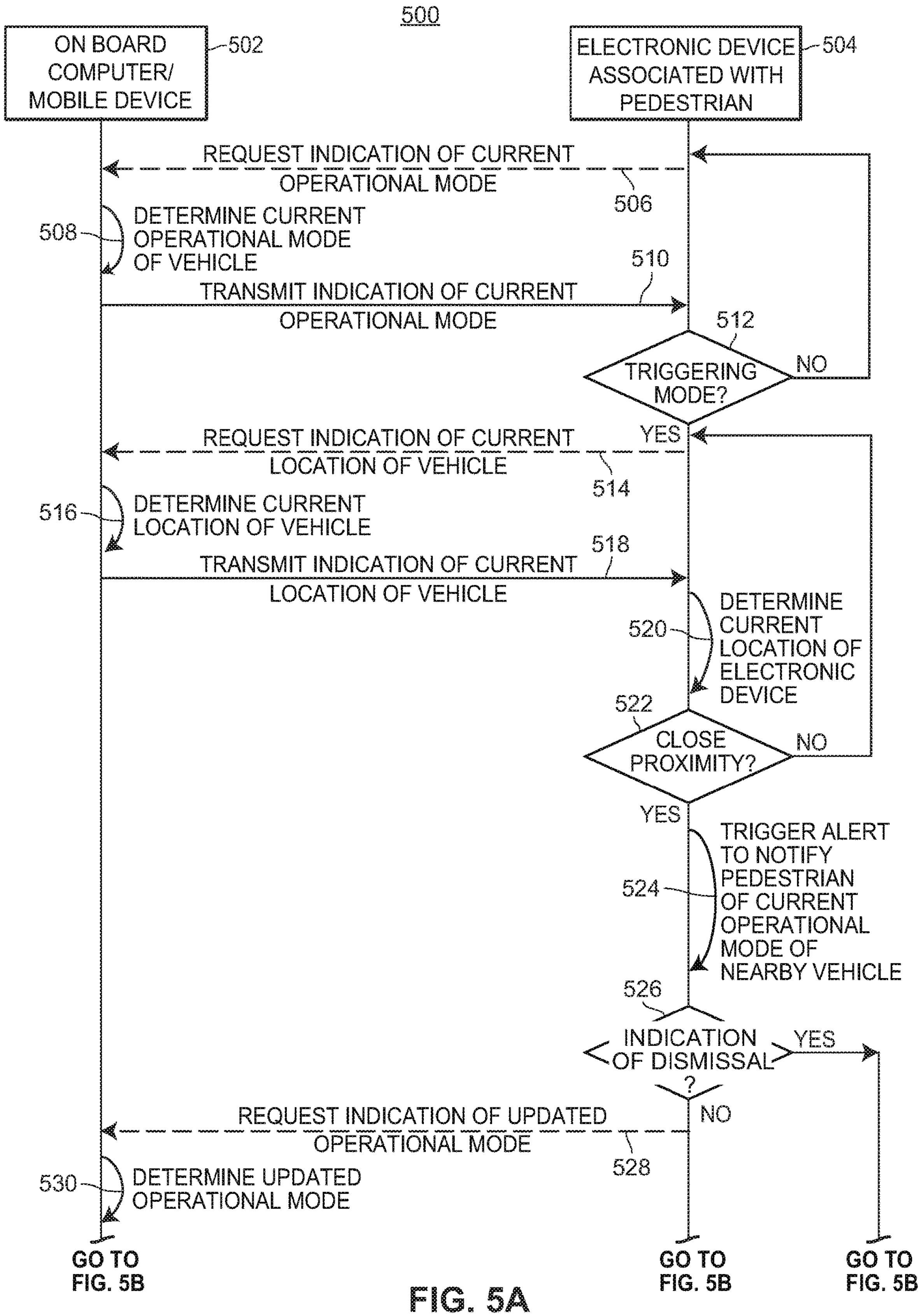
FIGS. 5A-5B depict a signal diagram associated with exemplary technology for alerting a pedestrian of an operational mode of a nearby vehicle, by an electronic device associated with the pedestrian.
Figure 5B:
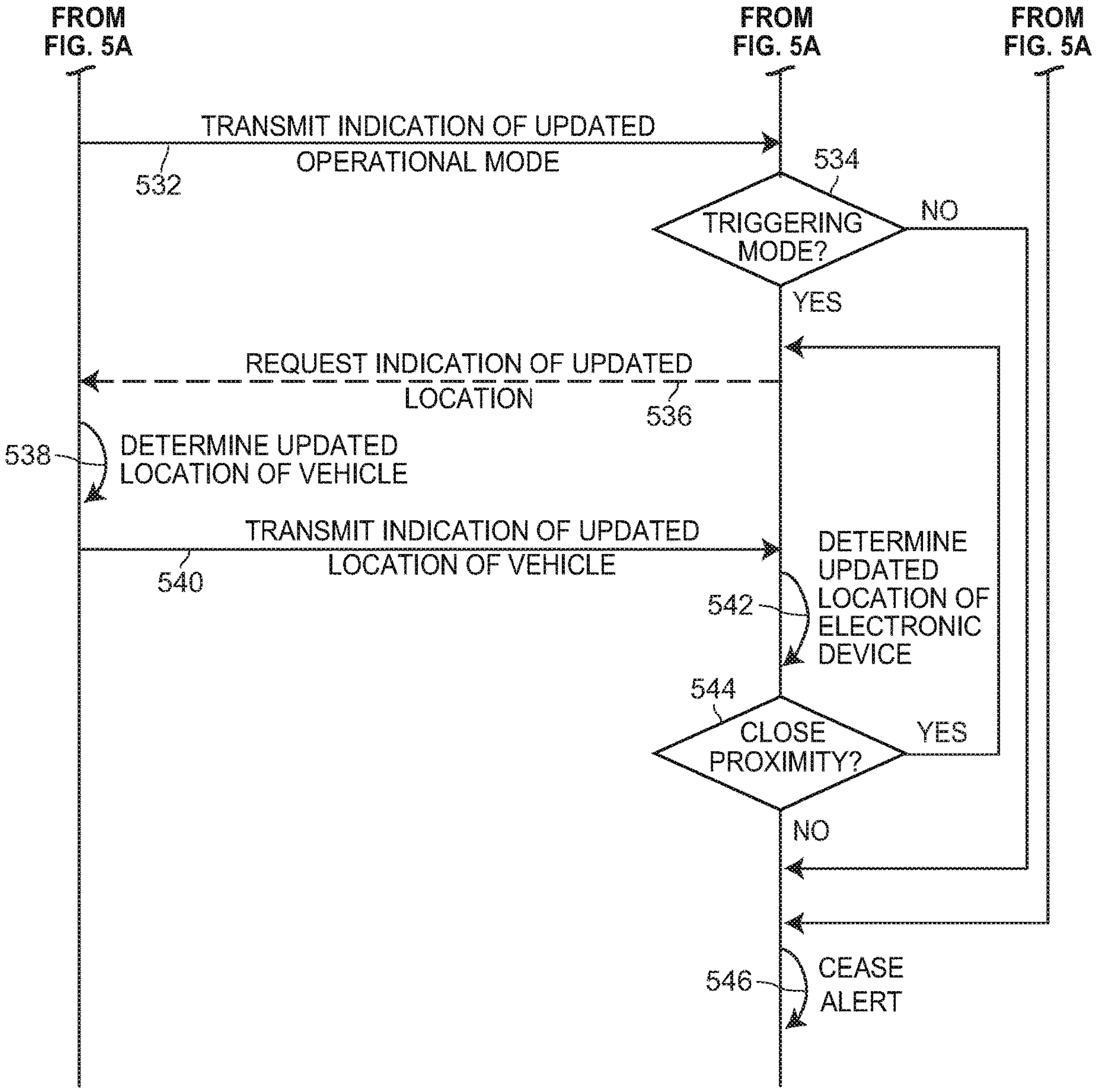

FIGS. 5A-5B depict a signal diagram 500 associated with exemplary technology for triggering an alert for a pedestrian via an electronic device associated with the pedestrian. The triggered alert may indicate the current operational mode of a nearby vehicle. The signal diagram 500 includes an on-board computer and/or mobile device 502 (such as, e.g. on-board computer 114 and/or mobile device 116), associated with a vehicle (e.g., vehicle 106), and an electronic device 504 (such as, e.g., electronic device 112) associated with a pedestrian (e.g., pedestrian 110). The on-board computer and/or mobile device 502 may be configured to communicate with the electronic device 504, and vice versa. It should be appreciated that additional or alternative components and/or devices are envisioned.

The signal diagram 500 may begin when the electronic device 504 associated with the pedestrian optionally requests (506) an indication of the current operational mode of the vehicle with which the on-board computer and/or mobile device 502 is associated 504 (e.g., via a communication unit 254, directly or via a network 118). The on-board computer and/or mobile device 502 may determine (508) the current operational mode (e.g., autonomous or manual) of the vehicle. The on-board computer and/or mobile device 502 may transmit (510) an indication of the current operational mode of the vehicle to the electronic device 504 (e.g., via a communication unit 204, directly or via a network 118).

The electronic device 504 may query (512) whether the current operational mode of the vehicle received from the on-board computer and/or mobile device 502 is a triggering mode. That is, in some embodiments alerts may only be triggered for a particular operational mode (e.g., only for a nearby vehicle operating autonomously, or only for a nearby vehicle operating manually). If the current operational mode of the vehicle is not the particular operational mode for which an alert may be triggered (512, NO), the electronic device 504 may make additional requests (506) and receive additional transmissions (510) of subsequent operational modes of the vehicle from the on-board computer and/or mobile device 502. In embodiments, the electronic device 504 may request (506), and/or the on-board computer and/or mobile device 502 may transmit (508), indications of the current operational mode of the vehicle periodically or constantly.

If the current operational mode of the vehicle is the particular operational mode for which an alert may be triggered (512, YES), the electronic device 504 may optionally request (514) an indication of the current location of the vehicle. The on-board computer and/or mobile device 502 may determine (516) the current location of the vehicle (e.g., by a GPS unit such as GPS unit 202). The on-board computer and/or mobile device 502 may transmit (518) an indication of the current location of the vehicle to the electronic device 504. The electronic device 504 may determine (520) the current location of the electronic device 504 (e.g. by a GPS unit such as GPS unit 252). The electronic device 504 may query (522) whether the current location of the vehicle is within a close proximity of the current location of the electronic device 504 (e.g., by a processor 268). For instance, the vehicle may be considered within a close proximity of the electronic device if the distance between their locations is less than a certain threshold distance (e.g., one mile, one block, 100 feet, etc.). If the current location of the vehicle is not within close proximity (e.g., the distance between the location of the vehicle and the location of the electronic device is greater than the threshold distance) of the current location of the electronic device 504, (522, NO) the electronic device 504 may make additional requests (514), and receive additional transmissions (516) of subsequent locations of the vehicle, from the on-board computer and/or mobile device 502, and may moreover make additional determinations (520) of the location of the electronic device 504.

If the current location of the vehicle is within a close proximity (e.g., the distance between the location of the vehicle and the location of the electronic device is less than the threshold distance) of the electronic device (522, YES), the electronic device 504 may trigger (524) an alert to notify the pedestrian of the current operational mode of the nearby vehicle. In various configurations, the alert may be, for instance, a sound, light, display, vibration, or any other suitable means of notifying the pedestrian of the current operational mode of the nearby vehicle.

In some embodiments, the electronic device 504 may query (526) whether there has been an indication of dismissal by a user, e.g., the pedestrian with which the electronic device is associated. For instance, the electronic device 504 may receive a dismissal of the alert from the pedestrian via a user interface (e.g., user interface 262), or via sensors (not shown) which may detect a gesture or word of the pedestrian indicating dismissal. If there has been an indication of dismissal (526, YES), the electronic device 504 may cease (546) the alert. If there has been no indication of dismissal (526, NO), the alert may persist.

The electronic device 504 may optionally request (528) an indication of an updated operational mode of the vehicle from the on-board computer and/or mobile device 502. Of course, as discussed above, in some embodiments the electronic device 504 may periodically or constantly request and/or receive such indications of updated operational modes of the vehicle. The on-board computer and/or mobile device 502 may determine (530) an updated operational mode of the vehicle and may transmit (532) an indication of the updated operational mode of the vehicle to the electronic device 504. The electronic device may query (534) whether the updated operational mode of the vehicle is still a triggering mode. If the updated operational mode is not (534, NO) still a triggering mode, the electronic device 504 may cease (546) the alert. If the updated operational mode of the vehicle is (534, YES) still a triggering mode, the alert may persist.

The electronic device 504 may optionally request (536) an indication of an updated location of the vehicle. Of course, as discussed above, in some embodiments the electronic device 504 may periodically or constantly request and/or receive such indications of updated locations of the vehicle. The on-board computer and/or mobile device 502 may determine (538) an updated location of the vehicle and may transmit (540) an indication of the updated location of the vehicle to the electronic device 504. The electronic device 504 may determine (542) an updated location of the electronic device (i.e., of itself). The electronic device may query (544) whether the location of the vehicle is still in close proximity of the location of the electronic device 504. If the location of the vehicle is still in close proximity of the location of the electronic device 504 (544, YES), the alert may persist. The electronic device 504 request (536) subsequent indications of updated locations of the vehicle, which may be determined (538) and transmitted (540) by the on-board computer and/or mobile device 502. If the location of the vehicle is no longer (544, NO) in close proximity of the location of the electronic device 504, the electronic device 504 may cease (546) the alert.

Figure 6A:
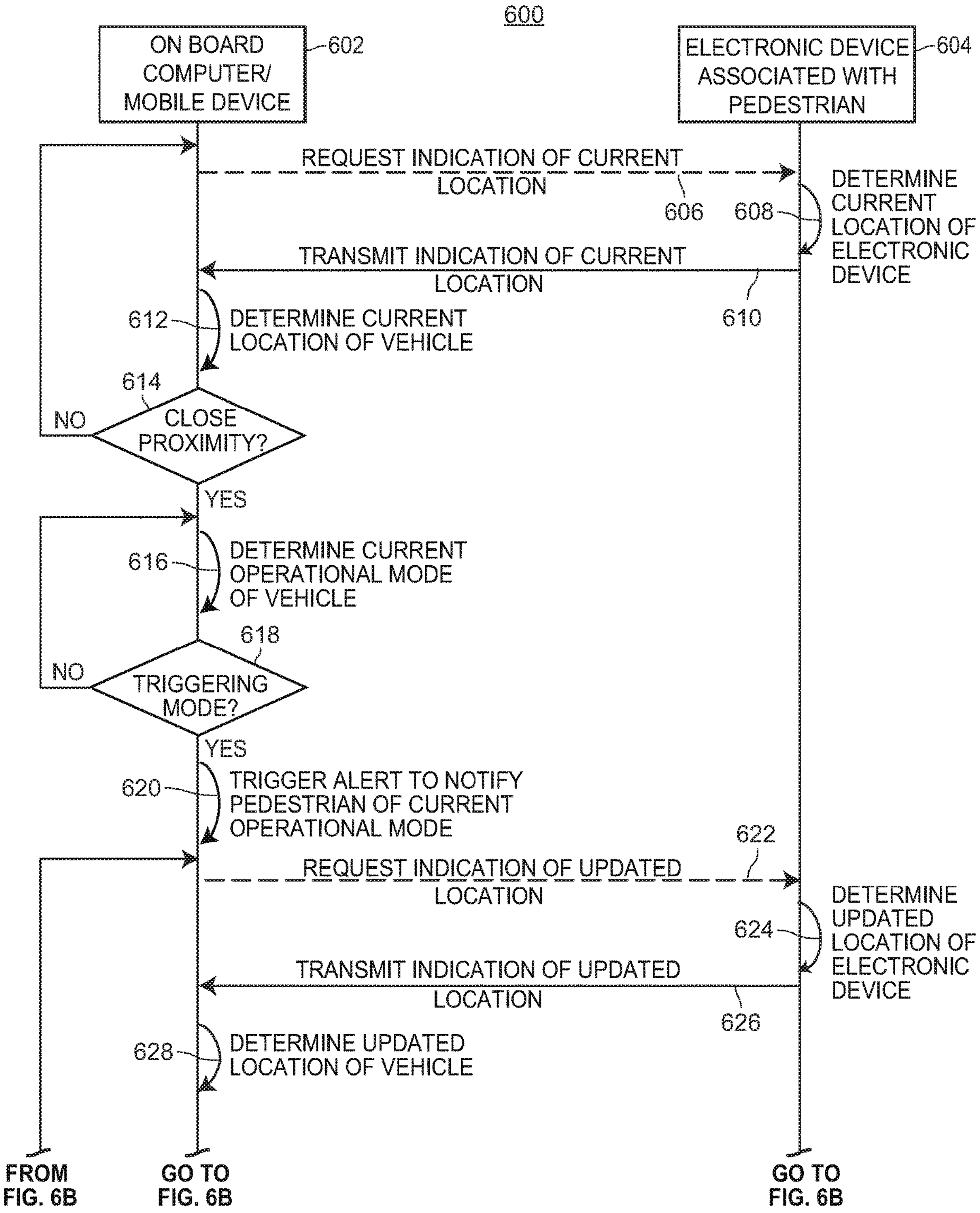
FIGS. 6A-6B depict a signal diagram associated with exemplary technology for alerting a nearby pedestrian of an operational mode of a vehicle, by an on-board computer and/or mobile device associated with the vehicle.
Figure 6B:
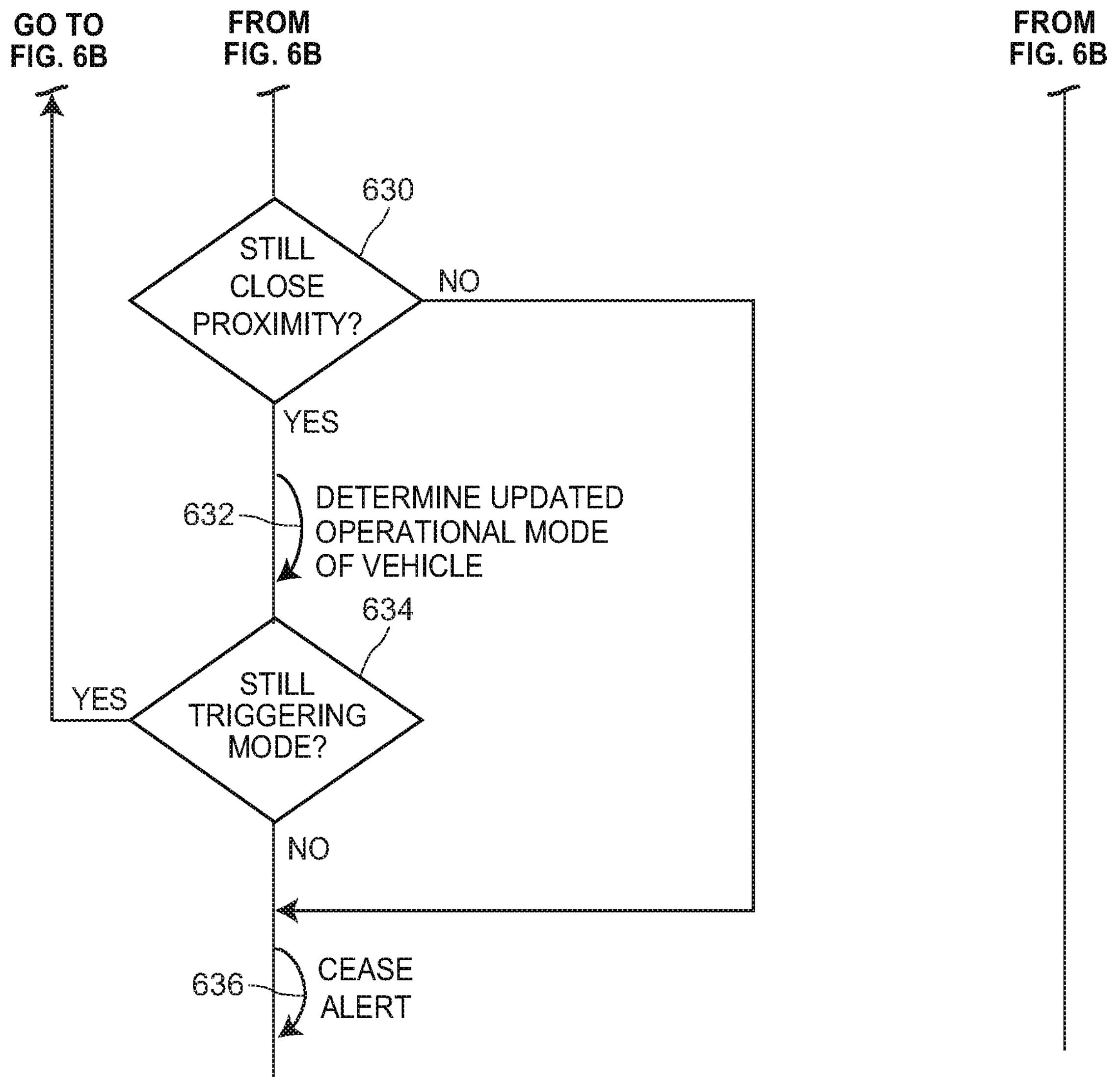

FIGS. 6A-6B depict a signal diagram 600 associated with exemplary technology for triggering an alert, via an on-board computer and/or mobile device associated with a vehicle, for notifying a nearby pedestrian. The triggered alert may indicate the current operational mode of the nearby vehicle. The signal diagram 600 includes an on-board computer and/or mobile device 602 (such as, e.g. on-board computer 114 and/or mobile device 116), associated with a vehicle (such as, e.g., vehicle 106), and an electronic device 604 (such as, e.g., electronic device 112) associated with a pedestrian (such as, e.g., pedestrian 108 or 110). The on-board computer and/or mobile device 602 may be configured to communicate with the electronic device 604, and vice versa. It should be appreciated that additional or alternative components and/or devices are envisioned.

The signal diagram 600 may begin when the on-board computer and/or mobile device 602 associated with the vehicle requests (606) an indication of the current location of the electronic device 604 associated with the pedestrian. The location of the electronic device 604 may be a proxy for the location of the pedestrian with whom the electronic device 604 is associated. In some embodiments, the electronic device 604 may periodically or constantly determine its own location and proceed accordingly. The request may be transmitted using a communication unit (such as, e.g., communication unit 204) and/or via a network (such as, e.g., network 118). The electronic device 604 may determine (608) its own current location, e.g., by using a GPS unit (such as GPS unit 252) disposed at the electronic device 604. The electronic device 604 may then transmit (610) an indication of its current location to the on-board computer and/or mobile device 602. The indication of the current location of the electronic device 604 may be transmitted using a communication unit disposed at the electronic device (such as, e.g., communication unit 254) and/or via a network (such as, e.g., network 118).

The on-board computer and/or mobile device 602 may determine the current location of the vehicle with which it is associated, e.g., by using a GPS unit (such as, e.g., GPS unit 202) disposed at the on-board computer and/or mobile device 602. In some embodiments, the on-board computer and/or mobile device 602 may periodically or constantly determine indications of the current location of the vehicle with which it is associated, and may proceed accordingly. Furthermore, the on-board computer and/or mobile device 602 may query whether the electronic device 604 is within close proximity of the vehicle. For instance, the on-board computer and/or mobile device 602 may determine, via a processor (such as, e.g., processor 212), the distance between the current location of the vehicle and the current location of the electronic device 604. If the distance is below a certain threshold distance (e.g., one mile, one block, 100 feet, etc.), the electronic device 604 may be within close proximity of the vehicle (614, YES). If the distance is greater than the certain threshold distance, the electronic device 604 may not be within close proximity of the vehicle (614, NO). If the electronic device 604 is not within close proximity of the vehicle, the on-board computer and/or mobile device 602 may again optionally request (606) an indication of the current location of the electronic device 604 and proceed accordingly.

If the electronic device 604 is within close proximity of the vehicle (614, YES), the on-board computer and/or mobile device 602 may determine (616) the current operational mode of the vehicle. In some embodiments, the on-board computer 602 may periodically or constantly determine the current operational mode of the vehicle, and may proceed accordingly. Furthermore, the on-board computer and/or mobile device 602 may query (618) whether the current operational mode of the vehicle is a triggering mode. That is, either an autonomous operational mode or a manual operational mode of the vehicle may trigger an alert in various embodiments. If the current operational mode of the vehicle is not a mode that may trigger the alert (618, NO), the on-board computer and/or mobile device 602 may determine (616) the current operational mode of the vehicle and may proceed accordingly. If the current operational mode of the vehicle is a mode that may trigger the alert (618, YES), the on-board computer and/or mobile device 602 may trigger an alert to notify a nearby pedestrian of the current operational mode of the vehicle. The alert may be, for instance, an alert generated by an external audio component (such as, e.g., external audio component 124) or an external display component (such as, e.g., external display component 126) of the vehicle 106. Moreover, the alert may be configured to be audible or visible to nearby pedestrians.

As the alert is sounded or displayed to be audible or visible to pedestrians external to the vehicle, the on-board computer and/or mobile device 602 may optionally request (622) an indication of an updated location of the electronic device 604. The electronic device 604 may determine (624) its updated location, and may transmit (626) an indication of the updated location to the on-board computer and/or mobile device 602. The on-board computer and/or mobile device 602 may determine (628) an updated location of the vehicle. The on-board computer and/or mobile device 602 may query (630) whether the electronic device 604 is still within close proximity of the vehicle. The query may include, for instance, determining whether the distance between the vehicle and the electronic device 604 is still within a certain threshold distance. If the distance between the vehicle and the electronic device 604 is greater than the threshold distance, the electronic device 604 may not still be within close proximity (630, NO). In that case, the on-board computer and/or mobile device 602 may cease (636) the alert.

If the distance between the vehicle and the electronic device 604 is less than (or equal to) the threshold distance, the electronic device 604 may still be within close proximity (630, YES). The on-board computer and/or mobile device 602 may determine (632) an updated operational mode of the vehicle. The on-board computer and/or mobile device 602 may query (634) whether the updated operational mode is still a triggering mode. That is, the updated operational mode may be the same operational mode as determined at 616, or a different operational mode. For instance, the vehicle may have switched from an autonomous operational mode to a manual operational mode while the alarm was being sounded or displayed. If the updated operational mode is still a triggering mode (634, YES), the on-board computer and/or mobile device 602 may again request (622) an indication of updated location of the electronic device 604 and proceed accordingly. If the updated operational mode is no longer a triggering mode (634, NO), the on-board computer and/or mobile device 602 may cease (636) the alert.

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method, comprising:

receiving, by an electronic device associated with a pedestrian, an indication of a current operational mode transmitted by a nearby vehicle wherein the current operational mode of the nearby vehicle is one of autonomous, semi-autonomous, or manual; and triggering, by the electronic device associated with the pedestrian, an alert based, at least in part, on a prevalence of vehicles in an area surrounding a current location of the electronic device, wherein statistical data indicating the prevalence of vehicles in the area surrounding the current location of the electronic device is retrieved from a database, the alert configured to notify a pedestrian of the current operational mode of the nearby vehicle.

2. The computer-implemented method of claim 1, wherein the triggered alert is one or more of a sound, vibration, light, or display of the electronic device.

3. The computer-implemented method of claim 1, further comprising:

ceasing the triggered alert upon receiving an indication of a dismissal of the triggered alert by the pedestrian.

4. The computer-implemented method of claim 1, further comprising ceasing the triggered alert when the nearby vehicle is no longer nearby.

5. The computer-implemented method of claim 4, wherein ceasing the triggered alert when the nearby vehicle is no longer nearby comprises:

receiving, by the electronic device, a location of the nearby vehicle;

determining, by the electronic device, that the location of the nearby vehicle is at least a threshold distance from the current location of the electronic device; and in response to the determining, ceasing the triggered alert.

6. The computer-implemented method of claim 4, wherein the indication is a short-range signal, and wherein ceasing the triggered alert when the nearby vehicle is no longer nearby comprises:

ceasing the triggered alert when the short-range signal is no longer received by the electronic device.

7. The computer-implemented method of claim 1, further comprising:

receiving, by the electronic device associated with the pedestrian, an indication of a preference to trigger the alert based on the current operational mode.

8. The computer-implemented method of claim 1, further comprising:

triggering a second alert when the current operational mode of the vehicle switches to another operational mode.

9. A tangible, non-transitory computer-readable medium storing executable instructions that, when executed by at least one processor, cause the at least one processor to:

receive an indication of a current operational mode transmitted by a nearby vehicle, wherein the current operational mode of the nearby vehicle is one of autonomous, semi-autonomous, or manual; and trigger an alert, by an electronic device associated with a pedestrian, based, at least in part, on a prevalence of vehicles in an area surrounding a current location of the electronic device, wherein statistical data indicating the prevalence of vehicles in the area surrounding the current location of the electronic device is retrieved from a database, the alert configured to notify the pedestrian of the current operational mode of the nearby vehicle.

10. The tangible, non-transitory computer-readable medium of claim 9, wherein the instructions, when executed by the at least one processor, further cause the at least one processor to cease the triggered alert when the nearby vehicle is no longer nearby.

11. The tangible, non-transitory computer-readable medium of claim 10, wherein ceasing the triggered alert when the nearby vehicle is no longer nearby comprises:

receiving a location of the nearby vehicle;

determining that the location of the nearby vehicle is at least a threshold distance from the current location of the electronic device; and in response to the determining, ceasing the triggered alert.

12. The tangible, non-transitory computer-readable medium of claim 10, wherein the indication is a short-range signal, and wherein ceasing the triggered alert when the nearby vehicle is no longer nearby comprises:

ceasing the triggered alert when the short-range signal is no longer received by the electronic device.

13. The tangible, non-transitory computer-readable medium of claim 9, wherein the instructions, when executed by the at least one processor, further cause the at least one processor to receive an indication of a preference to trigger the alert based on the current operational mode.

14. An electronic device, comprising:

a memory configured to store non-transitory computer executable instructions; and at least one processor configured to execute the non-transitory computer executable instructions to cause the at least one processor to:

receive an indication of a current operational mode transmitted by a nearby vehicle, wherein the current operational mode of the nearby vehicle is one of autonomous, semi-autonomous, or manual; and trigger an alert based, at least in part, on a prevalence of vehicles in an area surrounding a current location of the electronic device, wherein statistical data indicating the prevalence of vehicles in the area surrounding the current location of the electronic device is retrieved from a database, the alert configured to notify a pedestrian associated with the electronic device of the current operational mode of the nearby vehicle.

15. The electronic device of claim 14, wherein the instructions, when executed by the at least one processor, further cause the at least one processor to cease the triggered alert when the nearby vehicle is no longer nearby.

16. The electronic device of claim 15, wherein ceasing the triggered alert when the nearby vehicle is no longer nearby comprises:

receiving a location of the nearby vehicle;

determining that the location of the nearby vehicle is at least a threshold distance from the current location of the electronic device; and in response to the determining, ceasing the triggered alert.

17. The electronic device of claim 15, wherein the indication is a short-range signal, and wherein ceasing the triggered alert when the nearby vehicle is no longer nearby comprises:

ceasing the triggered alert when the short-range signal is no longer received by the electronic device.

18. The electronic device of claim 14, wherein the instructions, when executed by the at least one processor, further cause the at least one processor to receive an indication of a preference to trigger the alert based on the current operational mode.

19. The electronic device of claim 14, wherein the triggered alert is one or more of a sound, vibration, light, or display of the electronic device.

20. The electronic device of claim 14, wherein the computer executable instructions further cause the at least one processor to:

cease the triggered alert upon receiving an indication of a dismissal of the triggered alert by the pedestrian.

* * * * *